(12) United States Patent
Hasegawa

(10) Patent No.: US 7,251,239 B2
(45) Date of Patent: Jul. 31, 2007

(54) CODE DIVISION MULTIPLE ACCESS SYSTEMS USING A QUEUE FOR EACH SPREAD COEFFICIENT AND METHOD FOR CONTROLLING TRANSMISSION LINE CORRECTION TIMING OF THE SYSTEM

(75) Inventor: Jun Hasegawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1007 days.

(21) Appl. No.: 10/178,750

(22) Filed: Jun. 25, 2002

(65) Prior Publication Data

US 2002/0196756 A1 Dec. 26, 2002

(30) Foreign Application Priority Data

Jun. 26, 2001 (JP) ............................. 2001-193325

(51) Int. Cl.
*H04B 7/216* (2006.01)
(52) U.S. Cl. ....................... 370/342; 370/350
(58) Field of Classification Search ................ 370/320, 370/352, 324, 342
See application file for complete search history.

(56) References Cited

U.S. PATENT DOCUMENTS

| 5,233,626 A | * | 8/1993 | Ames | 375/148 |
| 5,506,861 A | * | 4/1996 | Bottomley | 370/441 |
| 5,619,524 A | | 4/1997 | Ling et al. | |
| 5,799,011 A | * | 8/1998 | LaRosa et al. | 370/335 |
| 6,226,320 B1 | * | 5/2001 | Hakkinen et al. | 375/225 |
| 6,381,229 B1 | * | 4/2002 | Narvinger et al. | 370/328 |
| 6,442,154 B1 | * | 8/2002 | Bottomley | 370/342 |
| 6,504,838 B1 | * | 1/2003 | Kwan | 370/352 |
| 7,095,814 B2 | * | 8/2006 | Kyeong et al. | 375/347 |

(Continued)

FOREIGN PATENT DOCUMENTS

EP 0 704 987 4/1996

(Continued)

OTHER PUBLICATIONS

Optimization of code rate and spreading factor for direct-sequenceCDMA systems; Bickel, M. et al.; Publication Date: Sep. 22-25, 1996 vol. 2, On pp. 585-589 vol. 2 Meeting Date: Sep. 22, 1996-Sep. 25, 1996.*

*Primary Examiner*—Hassan Kizou
*Assistant Examiner*—Salman Ahmed
(74) *Attorney, Agent, or Firm*—Oblon, Spivak, McClelland, Maier & Neustadt, P.C.

(57) ABSTRACT

A CDMA system includes first and second correlators, a delay buffer, a transmission-line correcting section, and a transmission-line estimating section. The delay buffer is supplied with the data for each symbol extracted from the first correlator to adjust a difference in timing at which the data is output from the first correlator, the difference being caused by a difference in spreading coefficient. The transmission-line correcting section is supplied with an output signal of the delay buffer. The estimating section is supplied with the data for each symbol extracted from the second correlator to obtain a transmission-line response from pilot information and supply transmission-line estimated value information to the transmission-line correcting section using the transmission-line response as an estimated value. The transmission-line correcting section makes a transmission-line correction to the information of the information channel based on the transmission-line estimated value information obtained by the transmission-line estimating section.

16 Claims, 11 Drawing Sheets

U.S. PATENT DOCUMENTS

2002/0122465 A1 * 9/2002 Agee et al. .................. 375/141
2002/0159507 A1 * 10/2002 Flaig et al. .................. 375/148

FOREIGN PATENT DOCUMENTS

| EP | 0 851 600 | 7/1998 |
|----|-----------|--------|
| EP | 0 932 263 | 7/1999 |
| EP | 1 091 501 | 4/2001 |
| JP | 10-504143 | 4/1998 |
| JP | 2001-267967 | 9/2001 |
| WO | WO 00/21201 | 4/2000 |

* cited by examiner

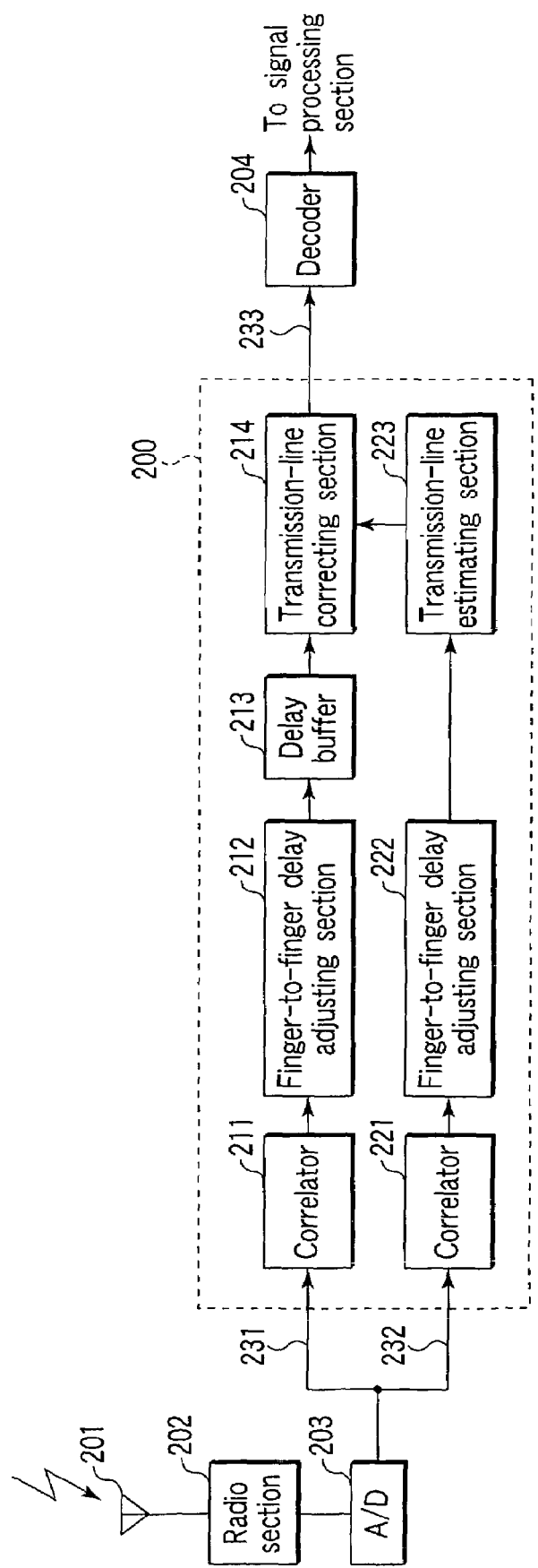
F I G. 4

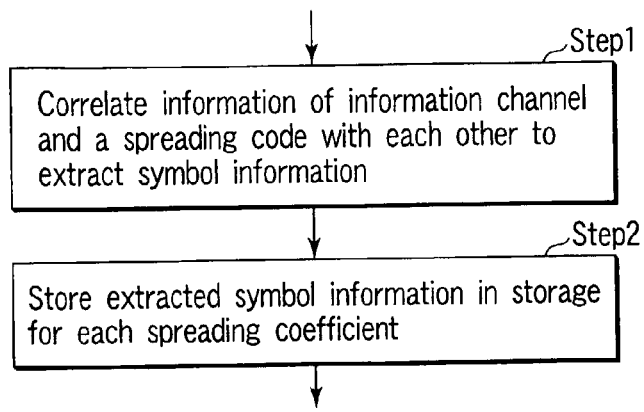
F I G. 6A
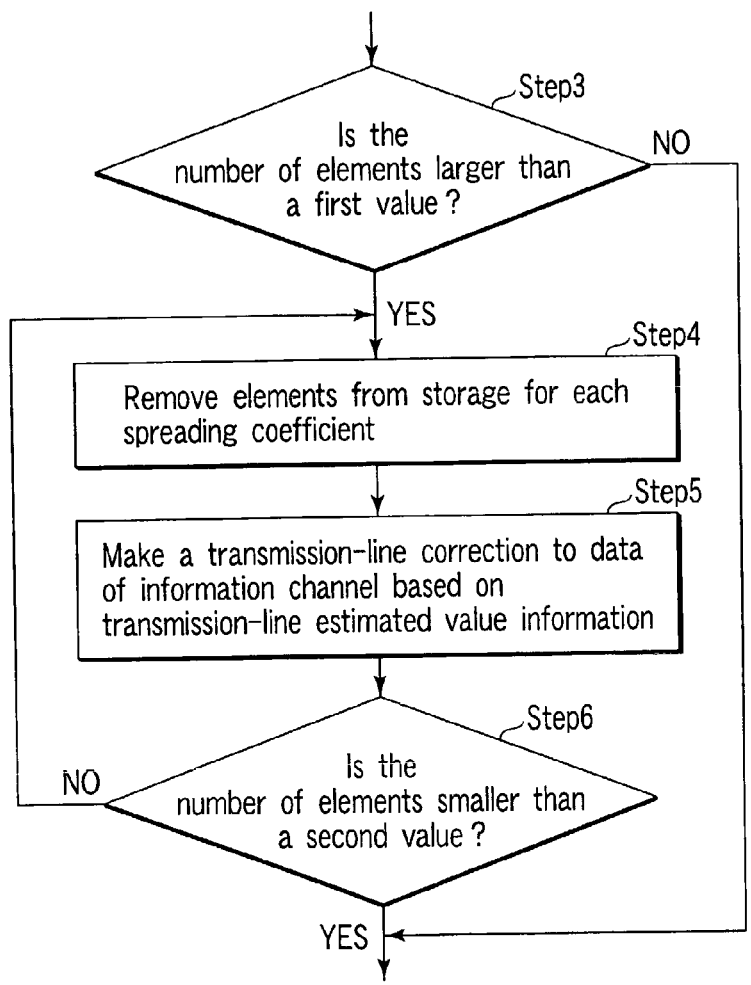
F I G. 6B

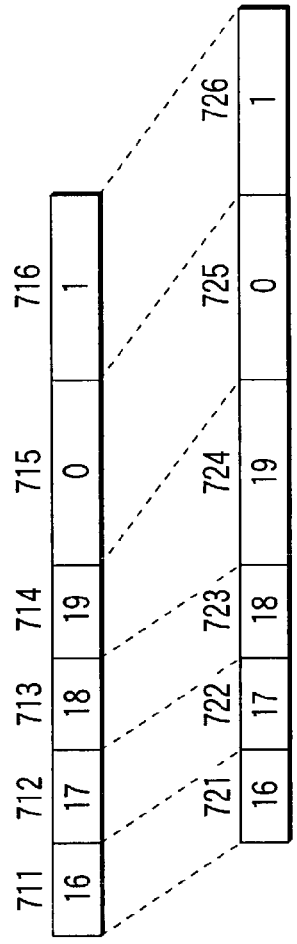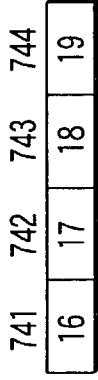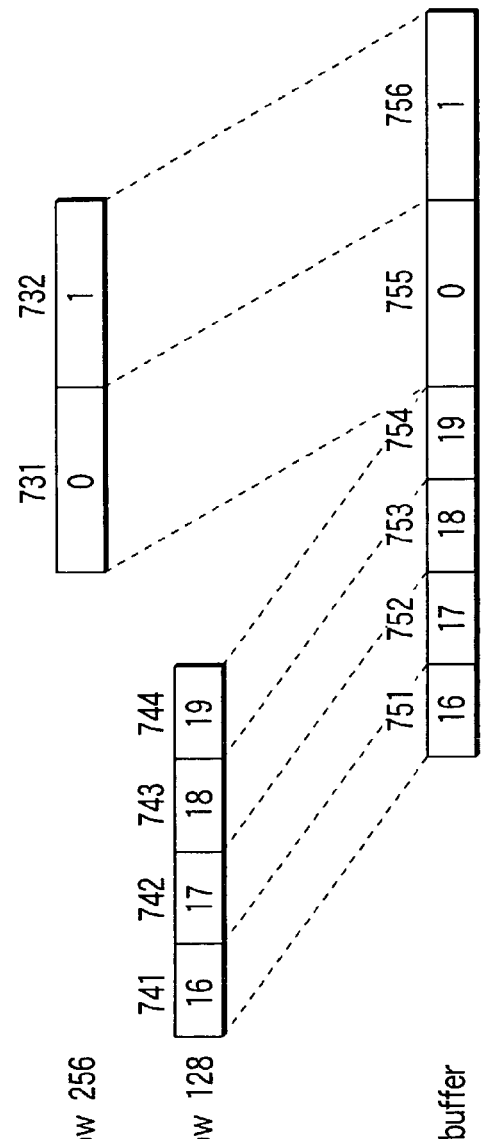
FIG. 8A
FIG. 8B

CODE DIVISION MULTIPLE ACCESS SYSTEMS USING A QUEUE FOR EACH SPREAD COEFFICIENT AND METHOD FOR CONTROLLING TRANSMISSION LINE CORRECTION TIMING OF THE SYSTEM

CROSS-REFERENCE TO RELATED APPLICATIONS

This application is based upon and claims the benefit of priority from the prior Japanese Patent Application No. 2001-193325, filed Jun. 26, 2001, the entire contents of which are incorporated herein by reference.

BACKGROUND OF THE INVENTION

1. Field of the Invention

The present invention relates to a radio communication system using a cellular phone such as a mobile phone and a car phone. More specifically, the invention relates to a code division multiple access system for eliminating a difference in output timing of data in each of a correlator of a pilot channel and that of an information channel using a queue for each spreading coefficient and a method for controlling transmission line correction timing of the system.

2. Description of the Related Art

Generally, CDMA (code division multiple access) includes a channel through which a pilot signal for making a transmission-line estimation flows (pilot channel) and a channel through which data flows (information channel). A receiving end can estimate a transmission-line response by transmitting a known pattern to the pilot channel. A received value of the information channel is corrected on the basis of the transmission-line estimated value, thereby decreasing an error rate of data.

FIG. 1 is a block diagram for explaining a prior art code division multiple access system and a method for controlling timing of transmission-line correction of the system. It shows a section 300 to which a transmission-line estimated value is applied for one finger. Information of an information channel is input to a correlator 311 via an input line 331. The correlator 311 correlates the information of the information channel with a spreading code and extracts data for each symbol (symbol information). When a plurality of fingers are used, the symbol information is input to a finger-to-finger delay adjustment section 312 in order to adjust a delay difference between fingers. When only one finger is used, no finger-to-finger delay adjustment is always required. The data of the finger-to-finger delay adjustment section 312 is supplied to a transmission-line correcting section 313.

On the other hand, information of the pilot channel is input to a correlator 321 via an input line 332. The correlator 321 correlates the information of the pilot channel with a spreading code and extracts data for each symbol (symbol information). When a plurality of fingers are used, the symbol information is input to a finger-to-finger delay adjustment section 322 in order to adjust a delay difference between fingers. When only one finger is used, no finger-to-finger delay adjustment is always required. The data of the section 322 is supplied to a transmission-line estimating section 323, in which a transmission-line response is obtained from the known pilot information. The section 323 outputs the transmission-line response to the transmission line correcting section 313 as transmission-line estimated value information.

The transmission-line correcting section 313 makes a transmission-line correction to the data of the information channel based on the transmission-line estimated value information obtained from the transmission-line estimating section 323. The corrected data is output from an output line 333.

There is a case where pilot and information channels differ in spreading coefficients in CDMA. For example, the spreading coefficient of the pilot channel tends to be set higher in order to decrease the error rate of the pilot channel. There is a case where the spreading coefficient of the information channel lowers in order to increase the transfer rate of data. Per-symbol time from when data is input to a correlator until it is output therefrom depends upon the length of a spreading code. The longer the spreading code (or the higher the spreading coefficient), the longer the per-symbol time.

Problems arising from variations in spreading coefficient will now be described in detail. FIG. 2A shows a relationship in symbol interval between data of a transmission line and that of a correlator when the spreading coefficient of each of pilot and information channels is 256, while FIG. 2B shows the same relationship when the spreading coefficient is 128. The correlators 311 and 321 observe a correlation between a spreading code and information of the information channel and a correlation between a spreading code and information of the pilot channel, respectively. Time required until data is output therefore corresponds to a value obtained by multiplying the spreading coefficient by per-chip time. The duration of the time is referred to as a one-symbol length in the spreading coefficient.

When the spreading coefficient is 256, symbol information items 411 to 414 in the transmission line correspond to data (symbol information) items 421 to 424 of the correlators 311 and 321 as shown in FIG. 2A. Paying attention to the symbol information item 411 with symbol number 0 in the transmission line, the symbol information item 421 is output from the correlators 311 and 321 after the symbol information item 411 is output, i.e., after the one-symbol length in the spreading coefficient. Time required until the symbol information items 412, 413 and 414 with symbol numbers 1, 2 and 3 are output from the correlators 311 and 321 as symbol information items 422, 423 and 424, respectively corresponds to the one-symbol length described above.

Similarly, when the spreading coefficient is 128, symbol information items 431 to 438 in the transmission line correspond to data items 441 to 448 of the correlators 311 and 321 as shown in FIG. 2B. Paying attention to the symbol information item 431 with symbol number 0 in the transmission line, the symbol information item 441 is output from the correlators 311 and 321 after the symbol information item 431 is output, i.e., after the one-symbol length in the spreading coefficient. Time required until the symbol information items 432, 433, 434, . . . and 438 with symbol numbers 1, 2, 3, . . . and 7 are output from the correlators 311 and 321 as symbol information items 442, 443, 444, . . . and 448 respectively corresponds to the one-symbol length corresponds to the one-symbol length described above.

The symbol length in the spreading coefficient of 256 is twice as long as that in the spreading coefficient of 128. Assume that symbol information item 411 with symbol number 0 in the spreading coefficient of 256 and the symbol information item in the spreading coefficient of 128 which is present in the transmission line during the same time period as the symbol information item 411, correspond to symbol information items 431 and 432 with symbol numbers 0 and 1, respectively. In this case, data of the correlators 311 and 321 corresponding to the symbol information item 411 with symbol number 0 in the spreading coefficient of 256 is symbol information item 421.

Data of the correlators corresponding to the symbol information items 431 and 432 with symbol numbers 0 and 1 in the spreading coefficient of 128 is symbol information items 441 and 442. The timing at which the symbol information items 411, 431 and 432 in the same transmission line are output from the correlators corresponds to the timing at which the symbol information items 421, 441 and 442 are output from the correlators. It is thus understood that the timing at which the symbol information item in the spreading coefficient of 256 is output from the correlators is delayed by a difference between the symbol length in the spreading coefficient of 256 and that in the spreading coefficient of 128.

When the pilot channel is transmitted with a spreading coefficient of 256 and the information channel is transmitted with a spreading coefficient of 128, the timings of a pilot symbol and an information symbol differ between the transmission line and the outputs of the correlators.

When the information channel does not change in spreading coefficient, a buffer is simply provided for an amount of delay to delay information of the information channel. The information of the information channel can thus be time-adjusted to that of the pilot channel that is transmitted during the same period in the transmission line. In the foregoing case, the information channel with a spreading coefficient of 128 is stored in the buffer and delayed by the time for 128 chips corresponding to a difference in symbol length. The symbol information items whose timing is the same as that of the pilot channel with a spreading coefficient of 256 in the transmission line can queue for each other.

When the information channel changes in spreading coefficient, an amount of delay varies dynamically and thus the control of timing becomes very complicated. This problem will be described with reference to FIGS. 3A and 3B.

FIGS. 3A and 3B show data of the correlators acquired when the information channel changes in spreading coefficient. In FIG. 3A, the spreading coefficient changes from 256 to 128. In FIG. 3B, it changes from 128 to 256.

First, let us consider a case where symbol information items 511 and 512 having symbol numbers 8 and 9 are transmitted with a spreading coefficient of 256 and symbol information items 513, 514, 515 and 516 having symbol numbers 0, 1, 2 and 3 are transmitted with a spreading coefficient of 128. The symbol information items 511 to 516 propagate through the transmission line at their respective symbol-length intervals. In contrast, symbol information items 521 to 526 output from the correlators propagate as shown in FIG. 3A. The symbol length of symbol information item 521 output from the correlators, which corresponds to the symbol information item 511 transmitted with a spreading coefficient of 256, is equal to the symbol length in the spreading coefficient of 256. However, the symbol interval of symbol information item 522 output from the correlators, which corresponds to the symbol information item 512 transmitted with a spreading coefficient of 256, is equal to the symbol length in the (changed) spreading coefficient of 128. The symbol information items 523 to 526 output from the correlators, which correspond to the symbol information items 513 to 516 transmitted after the spreading coefficient is changed, are output at symbol-length intervals in the spreading coefficient of 128.

Let us consider another case where symbol information items 531 and 534 having symbol numbers 16, 17, 18 and 19 are transmitted with a spreading coefficient of 128 and symbol information items 535 and 536 having symbol numbers 0 and 1 are transmitted with a spreading coefficient of 256. The symbol information items 531 to 536 propagate through the transmission line at their respective symbol-length intervals. Symbol information items 541 to 546 output from the correlators propagate as shown in FIG. 3B. The symbol interval of symbol information items 541 to 543 output from the correlators, which correspond to the symbol information items 531 to 533 transmitted with a spreading coefficient of 128, is equal to the symbol length in the spreading coefficient of 128. However, the symbol interval of symbol information item 544 output from the correlators, which corresponds to the symbol information item 534 transmitted with a spreading coefficient of 128, is equal to the symbol length in the (changed) spreading coefficient of 256. The symbol information items 545 and 546 output from the correlators, which correspond to the symbol information items 535 and 536 transmitted after the spreading coefficient is changed, are output at symbol-length intervals in the spreading coefficient of 256.

When the spreading coefficient is changed in the manner described above, the last symbol information before the change in spreading coefficient is used as the symbol length after that change.

Time required until the symbol information is output from the correlators also changes after the spread coefficient changes.

Assuming that the pilot channel is continuously transmitted with a fixed spreading coefficient, a time difference varies in units of symbol in a stage succeeding to the correlators of the pilot and information channels that are transmitted during the same period in the transmission line. In order to correctly make a transmission-line correction, however, symbol information items need to be used in combination of the information and pilot channels that are transmitted during the same period in the transmission line.

In order to adjust the time difference, timing needs to be controlled so as to change an amount of delay from the symbol information whose spreading coefficient varies. However, it is necessary to always recognize a boundary of symbol information items whose spreading coefficient vary, thus complicating the control of timing. Further, an amount of delay of different symbols needs to be changed according to a combination of spreading coefficients, which also complicates the control of timing.

The foregoing code division multiple access system has the following problem. When the spreading coefficient is changed during the transmission of symbol information in the transmission line, the symbol length of the symbol information is changed and the time required until the symbol information is output from the correlator is changed.

In order to resolve the above problem and exactly make a transmission-line correction, an amount of delay needs to be changed based on symbol information whose spreading coefficient varies and an amount of delay of different symbols needs to be changed according to a combination of spreading coefficients. The control of timing can thus be complicated.

BRIEF SUMMARY OF THE INVENTION

According to an aspect of the present invention, there is provided a code division multiple access system comprising a first correlator which correlates information of an information channel and a spreading code with each other to extract data for each symbol, a delay buffer which is supplied with the data for each symbol extracted from the first correlator to adjust a difference in timing at which the data is output from the first correlator, the difference being caused by a difference in spreading coefficient, a transmission-line correcting section which is supplied with an output signal of the delay buffer, a second correlator which correlates information of a pilot channel and a spreading code with each other to extract data for each symbol, and a transmission-line estimating section which is supplied with the data for each symbol extracted from the second correlator to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section.

According to another aspect of the present invention, there is provided a code division multiple access system comprising a first correlator which correlates information of an information channel and a spreading code with each other to extract data for each symbol, a first finger-to-finger delay adjusting section which is supplied with the data for each symbol extracted from the first correlator to adjust a delay difference between fingers, a delay buffer which is supplied with an output signal of the first finger-to-finger delay adjusting section to adjust a difference in timing at which the data is output from the first correlator, the difference being caused by a difference in spreading coefficient, a transmission-line correcting section which is supplied with an output signal of the delay buffer, a second correlator which correlates information of a pilot channel and a spreading code with each other to extract data for each symbol, a second finger-to-finger delay adjusting section which is supplied with the data for each symbol extracted from the second correlator to adjust a delay difference between fingers, and a transmission-line estimating section which is supplied with an output signal of the second finger-to-finger delay adjusting section to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section.

According to still another object of the present invention, there is provided a code division multiple access system comprising a first correlator which correlates information of an information channel and a spreading code with each other to extract data for each symbol, a first delay buffer which is supplied with the data for each symbol extracted from the first correlator to adjust a difference in timing at which the data is output from the first correlator, the difference being caused by a difference in spreading coefficient, a transmission-line correcting section which is supplied with an output signal of the first delay buffer, a second correlator which correlates information of a pilot channel and a spreading code with each other to extract data for each symbol, a second delay buffer which is supplied with the data for each symbol extracted from the second correlator to adjust a difference in timing at which the data is output from the second correlator, the difference being caused by a difference in spreading coefficient, and a transmission-line estimating section which is supplied with an output signal of the second delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section.

According to still another object of the present invention, there is provided a code division multiple access system comprising a first correlator which correlates information of an information channel and a spreading code with each other to extract data for each symbol, a first finger-to-finger delay adjusting section which is supplied with the data for each symbol extracted from the first correlator to adjust a delay difference between fingers, a first delay buffer which is supplied with an output signal of the first finger-to-finger delay adjusting section to adjust a difference in timing at which the data is output from the first correlator, the difference being caused by a difference in spreading coefficient, a transmission-line correcting section which is supplied with an output signal of the first delay buffer, a second correlator which correlates information of a pilot channel and a spreading code with each other to extract data for each symbol, a second finger-to-finger delay adjusting section which is supplied with the data for each symbol extracted from the second correlator to adjust a delay difference between fingers, a second delay buffer which is supplied with an output signal of the second finger-to-finger delay adjusting section to adjust a difference in timing at which the data is output from the second correlator, the difference being caused by a difference in spreading coefficient, and a transmission-line estimating section which is supplied with an output signal of the second delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section.

According to still another object of the present invention, there is provided a code division multiple access system comprising a first correlator which correlates information of an information channel and a spreading code with each other to extract data for each symbol, a transmission-line correcting section supplied with data from the first correlator, a second correlator which correlates information of a pilot channel and a spreading code with each other to extract data for each symbol, a delay buffer which is supplied with the data for each symbol extracted from the second correlator to adjust a difference in timing at which the data is output from the second correlator, the difference being caused by a difference in spreading coefficient, and a transmission-line estimating section which is supplied with an output signal of the delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section.

According to yet another object of the present invention, there is provided a code division multiple access system comprising a first correlator which correlates information of an information channel and a spreading code with each other to extract data for each symbol, a first finger-to-finger delay adjusting section which is supplied with the data for each symbol extracted from the first correlator to adjust a delay difference between fingers, a transmission-line correcting section supplied with an output signal of the first finger-to-finger delay adjusting section, a second correlator which correlates information of a pilot channel and a spreading code with each other to extract data for each symbol, a second finger-to-finger delay adjusting section which is supplied with the data for each symbol extracted from the second correlator to adjust a delay difference between fingers, a delay buffer which is supplied with an output signal of the second finger-to-finger delay adjusting section to adjust a difference in timing at which the data is output from the second correlator, the difference being caused by a difference in spreading coefficient, and a transmission-line estimating section which is supplied with an output signal of the delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section.

According to an aspect of the present invention, there is provided a method for controlling transmission-line correction timing of a code division multiple access system, comprising correlating information of an information channel and a spreading code with each other to extract data for each symbol, providing a delay to the extracted data for each symbol, the delay varying from spreading coefficient to spreading coefficient and making a transmission-line correction to the information of the information channel based on transmission-line estimated value information.

According to another aspect of the present invention, there is provided a method for controlling transmission-line correction timing of a code division multiple access system, comprising correlating information of an information channel and a spreading code with each other to extract data for each symbol, storing the extracted data for each symbol in a storage for each spreading coefficient, removing elements from the storage when the number of elements for each spreading coefficient held in the storage becomes larger than a given value, and making a transmission-line correction to the information of the information channel based on transmission-line estimated value information.

According to another aspect of the present invention, there is provided a method for controlling transmission-line correction timing of a code division multiple access system, comprising correlating information of an information channel and a spreading code with each other to extract data for each symbol, storing the extracted data for each symbol in a storage for each spreading coefficient, removing elements from the storage when the number of elements for each spreading coefficient held in the storage becomes larger than a first value, repeatedly removing elements until the number of elements becomes smaller than a second value after the elements start to be removed from the storage, and making a transmission-line correction to the information of the information channel based on transmission-line estimated value information.

According to still another aspect of the present invention, there is provided a method for controlling transmission-line correction timing of a code division multiple access system, comprising correlating information of an information channel and a spreading code with each other to extract data for each symbol, providing a delay to the extracted data of the information channel for each symbol, the delay varying from spreading coefficient to spreading coefficient, correlating information of a pilot channel and a spreading code with each other to extract data for each symbol, providing a delay to the extracted data of the pilot channel for each symbol, the delay varying from spreading coefficient to spreading coefficient, obtaining a transmission-line response from the data of the pilot channel for each symbol to which the delay is provided, and making a transmission-line correction to the information of the information channel based on transmission-line estimated value information using the transmission-line response as an estimated value.

According to still another aspect of the present invention, there is provided a method for controlling transmission-line correction timing of a code division multiple access system, comprising correlating information of an information channel and a spreading code with each other to extract data for each symbol, storing the extracted data of the information channel for each symbol in an information channel storage for each spreading coefficient, removing elements from the information channel storage when the number of elements for each spreading coefficient held in the information channel storage becomes larger than a given value, correlating information of a pilot channel and a spreading code with each other to extract data for each symbol, storing the extracted data of the pilot channel for each symbol in a pilot channel storage for each spreading coefficient, removing elements from the pilot channel storage when the number of elements for each spreading coefficient held in the pilot channel storage becomes larger than a given value, obtaining a transmission-line response from the elements removed from the pilot channel storage for each spreading coefficient, and making a transmission-line correction to the information of the information channel based on transmission-line estimated value information using the transmission-line response as an estimated value.

According to still another aspect of the present invention, there is provided a method for controlling transmission-line correction timing of a code division multiple access system, comprising correlating information of an information channel and a spreading code with each other to extract data for each symbol, storing the extracted data for each symbol in an information channel storage for each spreading coefficient, removing elements from the information channel storage when the number of elements for each spreading coefficient held in the information channel storage becomes larger than a first value, repeatedly removing elements until the number of elements becomes smaller than a second value after the elements start to be removed from the information channel storage, correlating information of a pilot channel and a spreading code with each other to extract data for each symbol, storing the extracted data for each symbol in a pilot channel storage for each spreading coefficient, removing elements from the pilot channel storage when the number of elements for each spreading coefficient held in the pilot channel storage becomes larger than a third value, repeatedly removing elements until the number of elements becomes smaller than a fourth value after the elements start to be removed from the pilot channel storage, obtaining a transmission-line response from the elements removed from the pilot channel storage for each spreading coefficient, and making a transmission-line correction to the information of the information channel based on the transmission-line estimated value information using the transmission-line response as an estimated value.

According to still another aspect of the present invention, there is provided a method for controlling transmission-line correction timing of a code division multiple access system, comprising correlating information of an information channel and a spreading code with each other to extract data for each symbol, correlating information of a pilot channel and a spreading code with each other to extract data for each symbol, providing a delay to the extracted data of the pilot channel for each symbol, the delay varying from spreading coefficient to spreading coefficient, obtaining a transmission-line response from the data of the pilot channel for each symbol to which the delay is provided, and making a transmission-line correction to the information of the information channel based on transmission-line estimated value information using the transmission-line response as an estimated value.

According to yet another aspect of the present invention, there is provided a method for controlling transmission-line correction timing of a code division multiple access system, comprising correlating information of an information channel and a spreading code with each other to extract data for each symbol, correlating information of a pilot channel and a spreading code with each other to extract data for each symbol, storing the extracted data of the pilot channel for each symbol in a storage for each spreading coefficient, removing elements from the storage when the number of elements for each spreading coefficient held in the storage becomes larger than a given value, obtaining a transmission-line response from the elements removed from the storage for each spreading coefficient, and making a transmission-line correction to the information of the information channel based on transmission-line estimated value information using the transmission-line response as an estimated value.

According to yet another aspect of the present invention, there is provided a method for controlling transmission-line correction timing of a code division multiple access system, comprising, correlating information of an information channel and a spreading code with each other to extract data for each symbol, correlating information of a pilot channel and a spreading code with each other to extract data for each symbol, storing the extracted data of the pilot channel for each symbol in a storage for each spreading coefficient, removing elements from the storage when the number of elements for each spreading coefficient held in the storage becomes larger than a first value, repeatedly removing elements until the number of elements becomes smaller than a second value after the elements start to be removed from the storage, obtaining a transmission-line response from the elements removed from the storage for each spreading coefficient and making a transmission-line correction to the information of the information channel based on transmission-line estimated value information using the transmission-line response as an estimated value.

BRIEF DESCRIPTION OF THE SEVERAL VIEWS OF THE DRAWING

FIG. 4 is a schematic block diagram for explaining a code division multiple access system according to a first embodiment of the present invention and a method for controlling timing of a transmission-line correction in the system, which shows a section to which a transmission-line estimated value for one finger is applied;

FIGS. 6A and 6B are flowcharts showing an example of a method for varying a spreading coefficient in the CDMA system shown in FIGS. 4 and 5;

FIGS. 8A and 8B are schematic diagrams each showing an example of a change from a low spreading coefficient to a high spreading one;

DETAILED DESCRIPTION OF THE INVENTION

Figure 1:
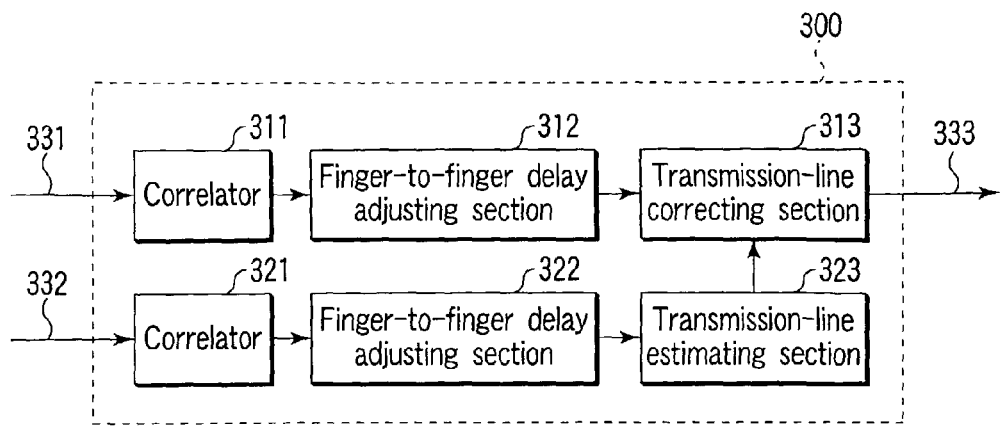
FIG. 1 is a block diagram for explaining a prior art code division multiple access system and a method for controlling timing of a transmission-line correction in the system, which shows a section to which a transmission-line estimated value for one finger is applied.
Figure 2A:
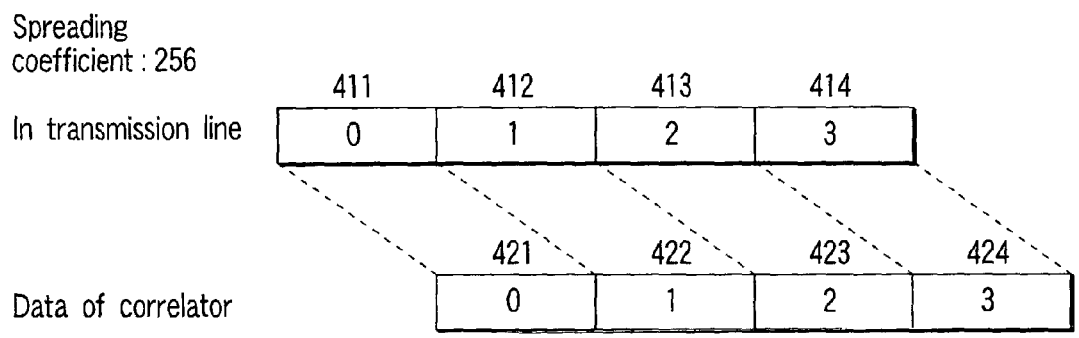
FIG. 2A is a schematic diagram showing a relationship in symbol interval between data of a transmission line and that of a correlator when the spreading coefficient of each of pilot and information channels is 256.
Figure 2B:
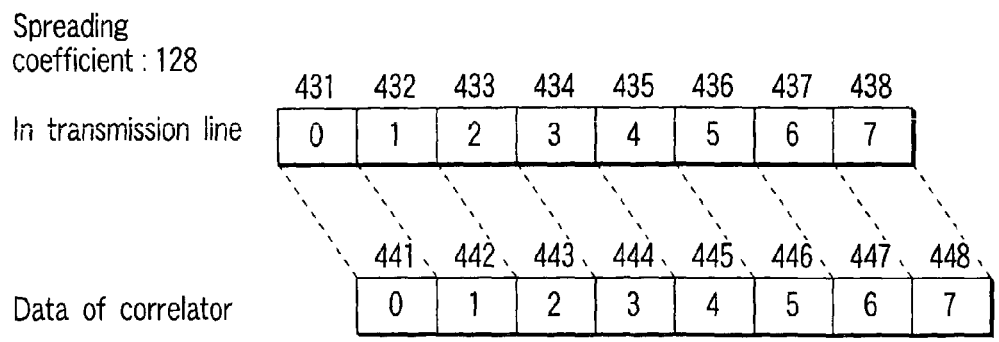
FIG. 2B is a schematic diagram showing a relationship in symbol interval between data of a transmission line and that of a correlator when the spreading coefficient of each of pilot and information channels is 128.
Figure 3A:
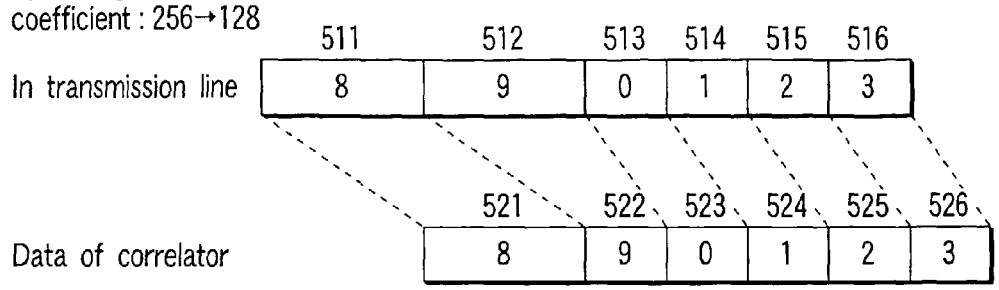
FIG. 3A is a schematic diagram showing data of a correlator when the spreading coefficient of the information channel changes from 256 to 128.
Figure 3B:
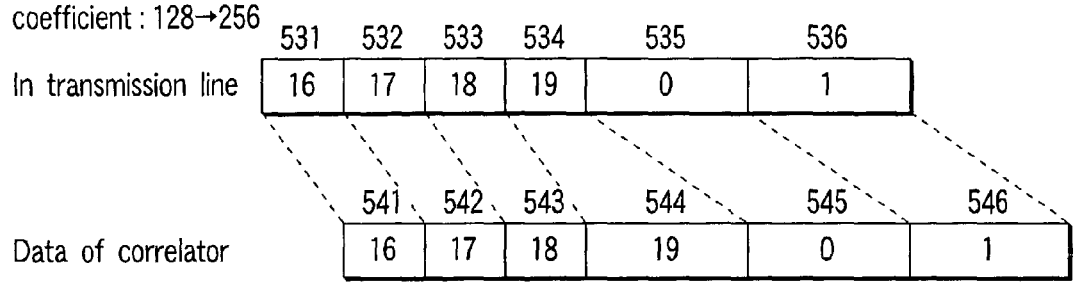
FIG. 3B is a schematic diagram showing data of a correlator when the spreading coefficient of the information channel changes from 128 to 256.

FIG. 4 is a schematic block diagram for explaining a code division multiple access (CDMA) system according to a first embodiment of the present invention and a method for controlling timing of a transmission-line correction in the CDMA system. It particularly shows a section 200 to which a transmission-line estimated value for one finger is applied.

Information of an information channel and that of a pilot channel are supplied from an antenna 201 to a radio section 202 and amplified. The amplified information is supplied to an analog/digital (A/D) converter 203 and converted to digital data. The radio section 202 includes a radio frequency amplifier (RF) and an intermediate frequency amplifier (IF). The digital data output from the A/D converter 203 is supplied to the section 200 and corrected. An output signal of the section 200 is decoded by a decoder 204. The decoded signal is supplied to a signal processing section such as a DSP and processed. During the decoding, an error of the signal is checked and corrected using an ECC (error-correcting code).

The section 200 includes a correlator 211, a finger-to-finger delay adjusting section 212, a delay buffer 213, a transmission-line correcting section 214, a correlator 221, a finger-to-finger delay adjusting section 222, and a transmission-line estimating section 223.

The information of the information channel output from the A/D converter 203 is input to the correlator 211 via an input line 231. The correlator 211 correlates the information of the information channel with a spreading code to extract data for each symbol (symbol information). If there are a plurality of fingers, the symbol information is input to the finger-to-finger delay adjusting section 212 to adjust a delay difference between the fingers. The information is then supplied to the delay buffer 213. The delay buffer 213 is used to adjust a difference in timing at which the symbol information is output from the correlator, the difference being caused by a difference in spreading coefficient. The adjusted symbol information is sent to the correcting section 214.

On the other hand, the information of the pilot channel output from the A/D converter 203 is input to the correlator 221 via an input line 232. The correlator 221 correlates the information of the pilot channel with a spreading code to extract data for each symbol (symbol information). If there are a plurality of fingers, the symbol information is input to the finger-to-finger delay adjusting section 222 to adjust a delay difference between the fingers. The information is then supplied to the estimating section 223. The estimating section 223 performs a complex multiplication or the like to obtain transmission-line estimated value information from the known pilot information and then supplies the information to the correcting section 214.

The correcting section 214 makes a transmission-line correction to the information of the information channel based on the transmission-line estimated value information obtained by the estimating section 223.

Figure 5:
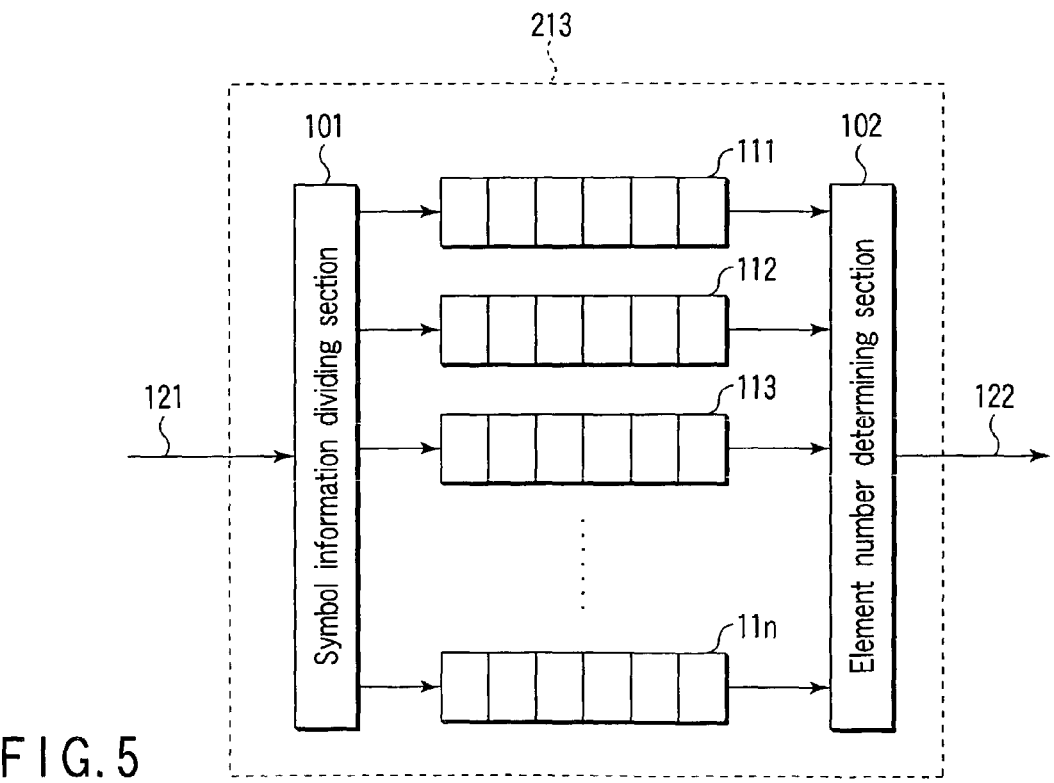
FIG. 5 is a block diagram showing an example of a configuration of the delay buffer in the section of FIG. 4.

FIG. 5 shows an example of a configuration of the delay buffer 213 shown in FIG. 4. The delay buffer 213 is supplied with symbol information from the finger-to-finger delay adjusting section 212 through the input line 121. A symbol information dividing section 101 is provided in an input stage of the delay buffer 213. The dividing section 101 divides the symbol information into FIFO storages (queues) 111 to 11n in accordance with the spreading coefficient of the spreading code used in the correlator 211. These FIFO storages 111 to 11n can be achieved by software using memories or registers. When the spreading coefficient of the spreading code is low, it is effective to use the memories. When it is high, the registers can be used to simplify the configuration and control of the system. Needless to say, the queues can be achieved by selectively using the memories and registers as appropriate in accordance with the spreading coefficient or by using a technique other than the FIFO storages. An element number determining section 102 determines whether the number of elements held in a storage for each spreading coefficient (spreading coefficient row) is larger than a given amount. If the number is larger than the given amount, the section 102 removes the elements from the spreading coefficient row and outputs them through an output line 122. If a read operation has already started from a certain storage (spreading coefficient row), it continues until the number of elements held therein becomes zero.

FIGS. 6A and 6B are flowcharts showing an example of a method for changing a spreading coefficient in the CDMA system shown in FIGS. 4 and 5. First, the correlator 211 correlates information of an information channel and a spreading code with each other to extract data (symbol information) for each symbol (step 1). Then, the symbol information is supplied to the finger-to-finger delay adjusting section 212 to adjust a delay difference between fingers. The symbol information dividing section 101 divides the extracted symbol information and stores them in the FIFO storages (queues) 111 to 11n according to the respective spreading coefficients (step 2). Thus, the extracted symbol information is provided with a delay for each spreading coefficient.

The element number determining section 102 determines whether the number of elements stored in each of the storages 111 to 11n is larger than a first value (step 3). When the number is larger than the first value, the section 102 removes the elements from the storage for each spreading coefficient (step 4). Then, the transmission-line correcting section 214 makes a transmission-line correction to the symbol information based on transmission-line estimated value information output from the transmission-line estimating section 223 (step 5). After that, the element number determining section 102 determines whether the number of elements stored in each storage is smaller than a second value (step 6) and continues to remove the elements until the number becomes smaller than the value. When the section 102 determines in step 3 that the number of elements is not larger than the first value and determines in step 6 that it is smaller than the second value, the change of the spreading coefficient is completed.

The FIFO input flow processing in FIG. 6A and the FIFO output flow processing in FIG. 6B are executed independently. To be more specific, steps 1 and 2 can be executed at any time when steps 3 through 6 are being executed.

Figure 7A:
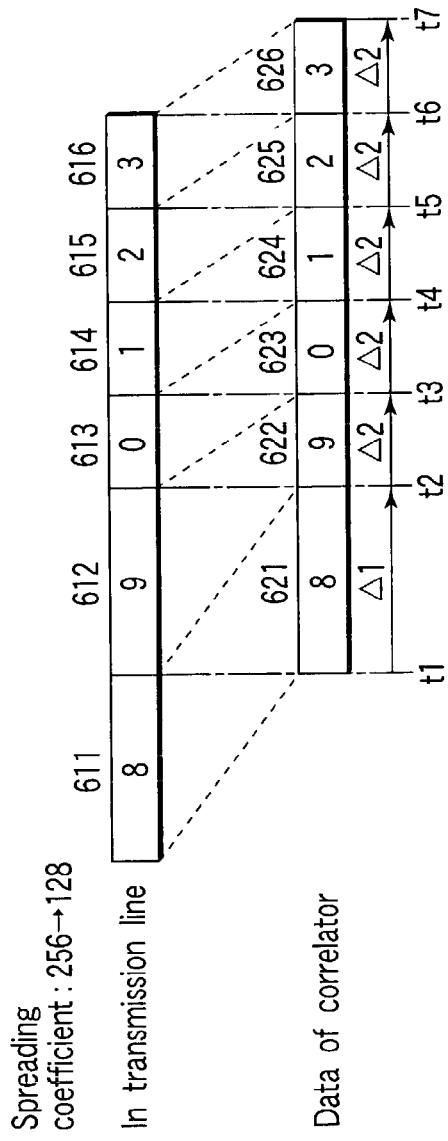
FIGS. 7A and 7B are schematic diagrams each showing an example of a change from a high spreading coefficient to a low spreading one.
Figure 7B:
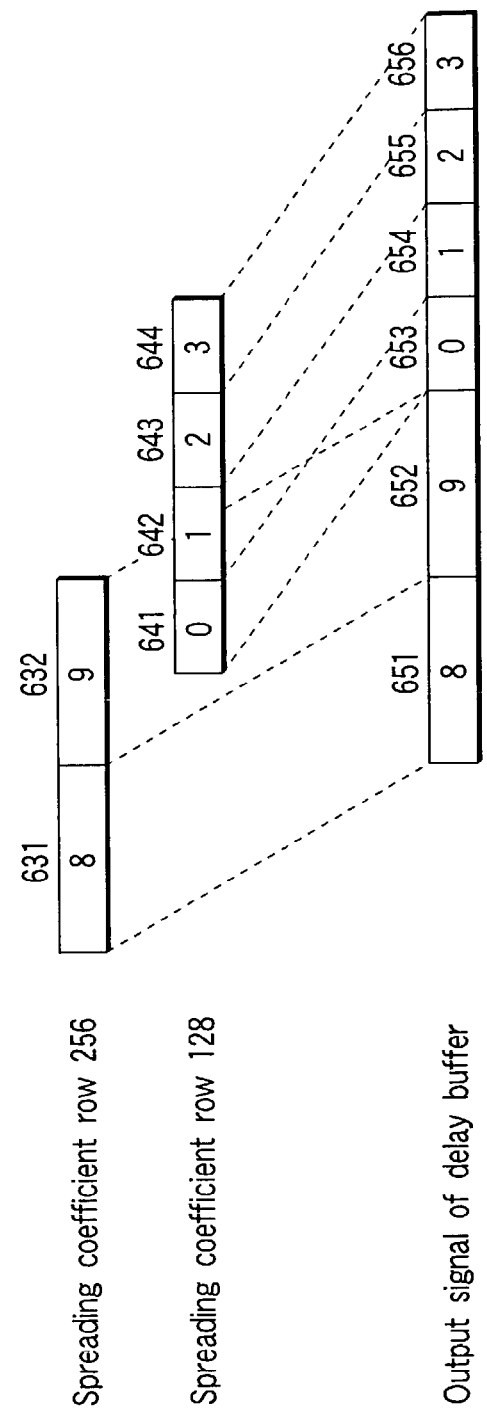

An example of a change from a high spreading coefficient to a low spreading one will now be described in detail with reference to FIGS. 7A and 7B. Let us consider a case as shown in FIG. 7A where symbol information items 611 and 612 having symbol numbers 8 and 9 are transmitted with a spreading coefficient of 256 and symbol information items 613, 614, 615 and 616 having symbol numbers 0, 1, 2 and 3 are transmitted with a spreading coefficient of 128. It is noted that symbol 8 cannot be the first one with a spreading coefficient of 256 but this case is directed to a change in spreading coefficient and thus the number of symbols belonging to the first spreading coefficient is decreased for convenience of descriptions. This also holds true for the drawings other than FIG. 7A.

The symbol information items 611 to 616 propagate through the transmission line at their respective symbol-length intervals. The data items (symbol information items) output from the correlators are indicated by reference numerals 621 to 626. The symbol information dividing section 101 divides the symbol information items 621 to 626 into the storages (spreading coefficient rows) corresponding to the spreading coefficients of the symbol information items. The storage corresponding to the spreading coefficient of 256 is defined as a spreading coefficient row of 256 and the storage corresponding to the spreading coefficient of 128 is defined as a spreading coefficient row of 128. The symbol information items 621 and 622 having symbol numbers 8 and 9, which are transmitted with the spreading coefficient of 256, are stored in their respective storages 631 and 632 of the spreading coefficient row of 256. The symbol information items 623, 624, 625 and 626 having symbol numbers 0, 1, 2 and 3, which are transmitted with the spreading coefficient of 128, are stored in their respective storages 641, 642, 643 and 644 of the spreading coefficient row of 128.

The symbol information items 611 to 616 in the transmission line are determined at their respective times t1 to t6 when signals constituting one symbol become complete. In other words, the symbol information item 611 having symbol number 8 is determined at time t1 and undetermined before that and the symbol information item 612 having symbol number 9 is determined at time t2 and undetermined before that. In contrast, the data items (symbol information items) 621 to 626 output from the correlators are determined at their respective times t1 to t6 when they are input. After that, the symbol information items are stored in their respective storages of the spreading coefficient rows of 256 and 128 corresponding to time period Δ1 (spreading coefficient of 256) and time period Δ2 (spreading coefficient of 128). For example, the symbol information item 621 having symbol number 8 is determined at time t1 and stored in the storage 631 corresponding to the spreading coefficient row of 256 for the time period Δ1. The symbol information item 622 having symbol number 9 is determined at time t2 and stored in the storage 632 corresponding to the spreading coefficient row of 256 for the time period Δ1. Further, the symbol information item 623 having symbol number 0 is determined at time t3 and stored in the storage 641 corresponding to the spreading coefficient row of 128 for the time period Δ2.

The element number determining section 102 determines the number of elements stored in the respective storages (spreading coefficient rows). When the number of elements reaches a given value, the section 102 starts to extract elements from the spreading coefficient rows. Assume that the number of elements in the spreading coefficient row of 256 is two and the number of elements in the spreading coefficient row of 128 is four. As shown in FIG. 7B, the symbol information item 621 having symbol number 8, which is stored in the storage 631 of the spreading coefficient row of 256, is read out of the delay buffer 213 and output as a symbol information item 651 since the number of elements in the spreading coefficient row of 256 becomes two when the symbol information item having symbol number 9 is stored in the storage 632. The symbol information item 622 having symbol number 9, which is stored in the storage 632 of the spreading coefficient row of 256, is read out of the delay buffer 213 and output as a symbol information item 652 since the number of elements in the spreading coefficient row is not zero. The symbol information 623 having symbol number 0, which is stored in the storage 641 of the spreading coefficient row of 128, is read out of the delay buffer 213 and output as a symbol information item 653 since the number of elements in the spreading coefficient row of 128 becomes four when the symbol information item having symbol number 3 is stored in the storage 644 of the spreading coefficient row of 128. The symbol information items 624, 625 and 626 having symbol numbers 1, 2 and 3, which are stored in the storages 642, 643 and 644 of the spreading coefficient row of 128, are read out of the delay buffer 213 and output as symbol information items 654, 655 and 656 since the number of elements in the spreading coefficient row of 128 is not zero. The symbol interval of each of the symbol information items 651 to 656 output from the delay buffer 213 is the same as that of its corresponding one of symbol information items 611 to 616 in the transmission line.

An example of a change from a low spreading coefficient to a high spreading one will now be described with reference to FIGS. 8A and 8B. Let us consider a case where symbol information items 711 to 714 having symbol numbers 16 to 19 are transmitted with a spreading coefficient of 128 and symbol information items 715 and 716 having symbol numbers 0 and 1 are transmitted with a spreading coefficient of 256. As shown in FIG. 8A, the symbol information items 711 to 716 propagate through the transmission line at their respective symbol-length intervals. The symbol information items output from the correlators are indicated by reference numerals 721 to 726. The symbol information dividing section 101 divides the symbol information items into the storages (spreading coefficient rows) corresponding to the spreading coefficients of the symbol information items. The storage corresponding to the spreading coefficient of 256 is defined as a spreading coefficient row of 256 and the storage corresponding to the spreading coefficient of 128 is defined as a spreading coefficient row of 128. The symbol information items 721 to 724 having symbol numbers 16 to 19, which are transmitted with the spreading coefficient of 128, are stored in their respective storages 741 to 744 of the spreading coefficient row of 128. The symbol information items 725 and 726 having symbol numbers 0 and 1, which are transmitted with the spreading coefficient of 256, are stored in their respective storages 731 and 732 of the spreading coefficient row of 256.

The element number determining section 102 determines the number of elements stored in the respective storages (spreading coefficient rows). When the number of elements reaches a given value, the section 102 starts to extract elements from the spreading coefficient rows. Assume that the number of elements in the spreading coefficient row of 256 is two and the number of elements in the spreading coefficient row of 128 is four. As shown in FIG. 8B, the symbol information 721 having symbol number 16, which is stored in the storage 741 of the spreading coefficient row of 128, is read out of the delay buffer 213 and output as a symbol information item 751 since the number of elements in the spreading coefficient row of 128 becomes four when the symbol information item having symbol number 19 is stored in the storage 744. The symbol information items 722, 723 and 724 having symbol numbers 17, 18 and 19, which is stored in the storages 742, 743 and 744 of the spreading coefficient row of 128, is read out of the delay buffer 213 and output as symbol information items 752, 753 and 754 since the number of elements in the spreading coefficient row is not zero. The symbol information item 725 having symbol number 0, which is stored in the storage 731 of the spreading coefficient row of 256, is read out of the delay buffer 213 and output as a symbol information item 755 since the number of elements in the spreading coefficient row of 256 becomes two when the symbol information item 726 having symbol number 1 is stored in the storage 732 of the spreading coefficient row of 256. The symbol information item 726 having symbol number 1, which is stored in the storage 732 of the spreading coefficient row of 256, is read out of the delay buffer 213 and output as a symbol information item 756 since the number of elements in the spreading coefficient row of 256 is not zero. The symbol interval of each of the symbol information items 751 to 756 output from the delay buffer 213 is the same as that of its corresponding one of symbol information items 711 to 716 in the transmission line.

It is understood from the above two cases that the number of elements in the spreading coefficient row can be controlled in the same manner for both a change from a high spreading coefficient to a low spreading one and a change from a low spreading coefficient to a high spreading one.

The symbol length of information of the pilot channel can be converted to that in the transmission line under the same control. Therefore, the timing of the information channel and that of the pilot channel, which are the same in the transmission line, can be conformed to each other after the correlators output data, with the result that a transmission line correction to the data can be made with exact timing.

Consequently, there can be provided a code division multiple access system for eliminating a difference in timing at which data is output from each of correlators of pilot and information channels using a queue for each spreading coefficient and a method for controlling transmission-line correction timing of the system.

Figure 9A:
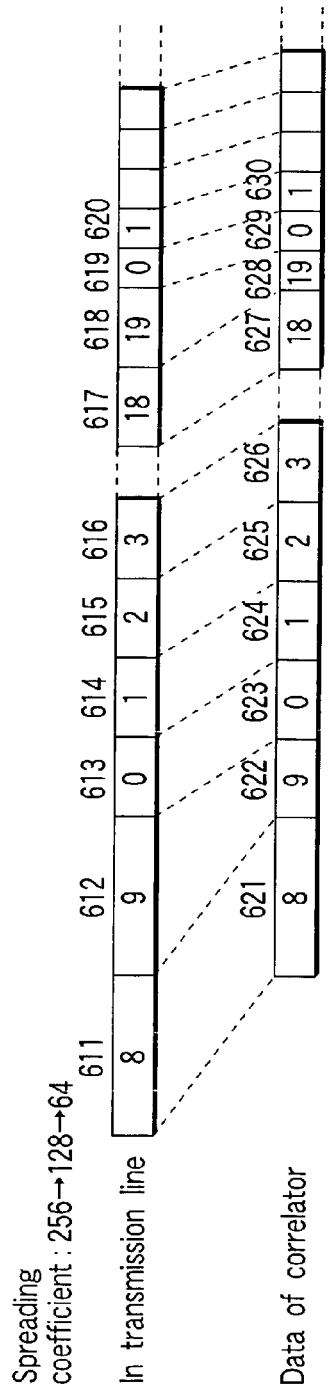
FIGS. 9A and 9B are schematic diagrams each showing an example of a three-step change from a high spreading coefficient to a low spreading one.
Figure 9B:
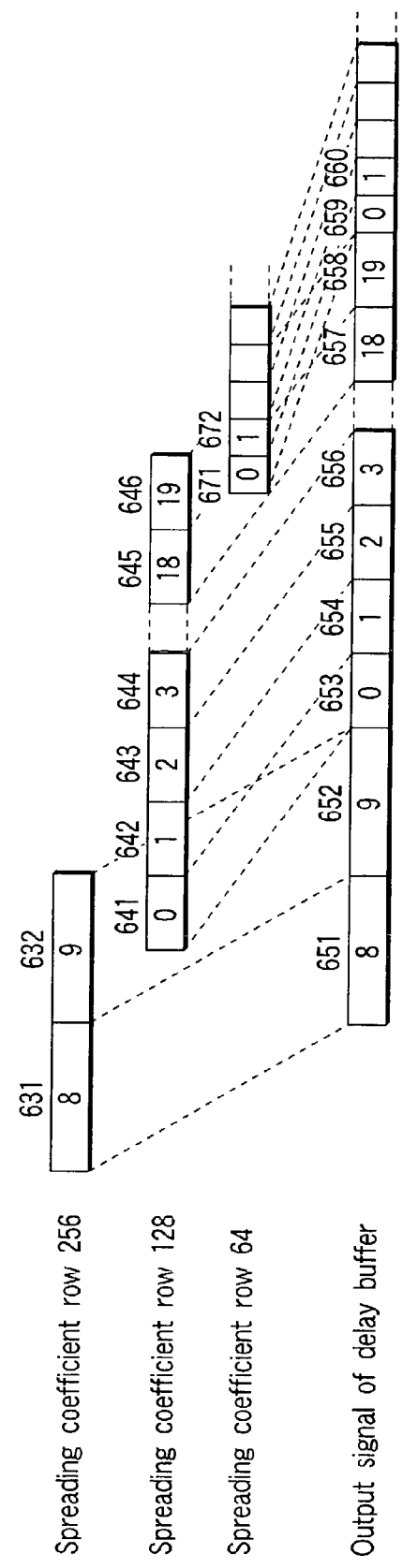

FIGS. 9A and 9B show an example of a three-step change from a high spreading coefficient to a low spreading one. The spreading coefficient changes from 256 to 128 and then from 128 to 64. As shown in FIG. 9A, let us consider a case where symbol information items 611 and 612 having symbol numbers 8 and 9 are transmitted with a spreading coefficient of 256, symbol information items 613, 614, 615, 616, . . . 617 and 618 having symbol numbers 0, 1, 2, 3, . . . , 18 and 19 are transmitted with a spreading coefficient of 128, and symbol information items 619, 620, . . . having symbol numbers 0, 1, . . . are transmitted with a spreading coefficient of 64. The symbol information items 611 to 620 propagate through the transmission line at their respective symbol-length intervals. The symbol information items output from the correlators are indicated by reference numerals 621 to 630. The symbol information dividing section 101 divides the symbol information items 621 to 630 into the storages (spreading coefficient rows) corresponding to the spreading coefficients of the symbol information items. The storages corresponding to the spreading coefficients of 256, 128 and 64 are defined as spreading coefficient rows of 256, 128 and 64, respectively. The symbol information items 621 and 622 having symbol numbers 8 and 9, which are transmitted with the spreading coefficient of 256, are stored in their respective storages 631 and 632 of the spreading coefficient row of 256. The symbol information items 623, 624, 625, 626, . . . , 627 and 628 having symbol numbers 0, 1, 2, 3, . . . , 18 and 19, which are transmitted with the spreading coefficient of 128, are stored in their respective storages 641, 642, 643, 644, . . . , 645 and 646 of the spreading coefficient row of 128. Further, the symbol information items 629, 630, . . . having symbol numbers 0, 1, . . . , which are transmitted with the spreading coefficient of 64, are stored in their respective storages 671, 672, . . . of the spreading coefficient row of 64.

The element number determining section 102 determines the number of elements stored in the respective storages (spreading coefficient rows). When the number of elements reaches a given value, the section 102 starts to extract elements from the spreading coefficient rows. Assume that the number of elements in the spreading coefficient row of 256 is two, the number of elements in the spreading coefficient row of 128 is four, and the number of elements in the spreading coefficient row of 64 is eight. As shown in FIG. 9B, the symbol information item 621 having symbol number 8, which is stored in the storage 631 of the spreading coefficient row of 256, is read out of the delay buffer 213 and output as a symbol information item 651 since the number of elements in the spreading coefficient row of 256 becomes two when the symbol information item 622 having symbol number 9 is stored in the storage 632. The symbol information item 622 having symbol number 9, which is stored in the storage 632 of the spreading coefficient row of 256, is read out of the delay buffer 213 and output as symbol information item 652 since the number of elements in the spreading coefficient row of 256 is not zero. The symbol information item 623 having symbol number 0, which is stored in the storage 641 of the spreading coefficient row of 128, is read out of the delay buffer 213 and output as a symbol information item 653 since the number of elements in the spreading coefficient row of 128 becomes four when the symbol information item having symbol number 3 is stored in the storage 644 of the spreading coefficient row of 128. The symbol information items 624, 625, 626, . . . , 627 and 628 having symbol numbers 1, 2, 3, . . . , 18 and 19, which are stored in the storages 642, 643, 644, . . . , 645 and 646 of the spreading coefficient row of 128, are read out of the delay buffer 213 and output as symbol information items 654, 656, 656, . . . , 657 and 658 since the number of elements in the spreading coefficient row of 128 is not zero. The symbol information item 629 having symbol number 0, which is stored in the storage of the spreading coefficient row of 64, is read out of the delay buffer 213 and output as a symbol information item 659 since the number of elements in the spreading coefficient row of 64 becomes eight when the symbol information item having symbol number 7 is stored in the storage 678 (not shown) of the spreading coefficient row of 64. The symbol information item 630 having symbol number 1, which is stored in the storage 672 of the spreading coefficient row of 64, is read out of the delay buffer 213 and output as symbol information item 660 since the number of elements in the spreading coefficient row of 64 is not zero. The symbol interval of each of the symbol information items 651 to 660 output from the delay buffer 213 is the same as that of its corresponding one of symbol information items 611 to 620 in the transmission line.

Figure 10A:
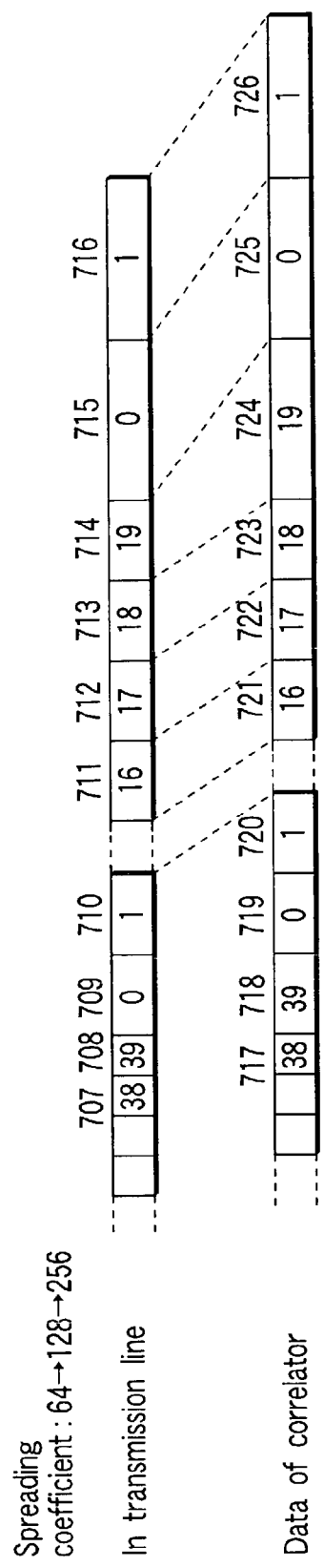
FIGS. 10A and 10B are schematic diagrams each showing an example of a three-step change from a low spreading coefficient to a high spreading one.
Figure 10B:
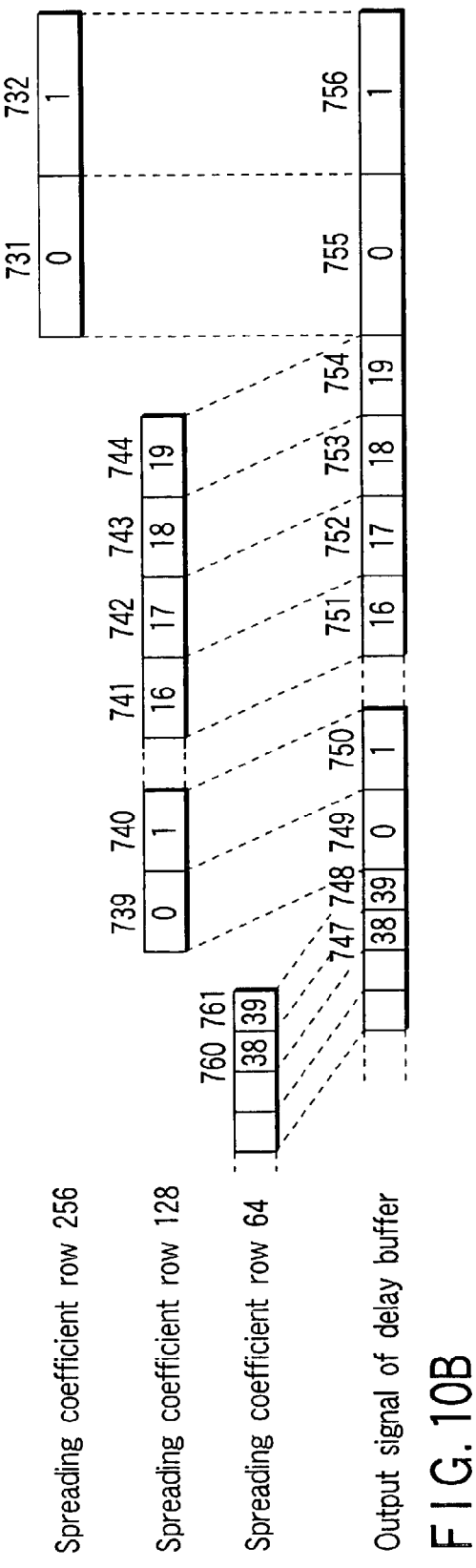

FIGS. 10A and 10B show an example of a three-step change from a low spreading coefficient to a high spreading one. The spreading coefficient changes from 64 to 128 and then from 128 to 256. Let us consider a case where symbol information items 707 and 708 having symbol numbers 38 and 39 are transmitted with a spreading coefficient of 64, symbol information items 709, 710, . . . , 711, 712, 713 and 714 having symbol numbers 0, 1, . . . , 16, 17, 18 and 19 are transmitted with a spreading coefficient of 128, and symbol information items 715 and 716 having symbol numbers 0 and 1 are transmitted with a spreading coefficient of 256. As shown in FIG. 10A, the symbol information items 707 to 716 propagate through the transmission line at their respective symbol-length intervals. The symbol information items output from the correlators are indicated by reference numerals 717 to 726. The symbol information dividing section 101 divides the symbol information items 717 to 726 into the storages (spreading coefficient rows) corresponding to the spreading coefficients of the symbol information items. The storages corresponding to the spreading coefficients of 256, 128 and 64 are defined as spreading coefficient rows of 256, 128 and 64, respectively. The symbol information items 717 and 718 having symbol numbers 38 and 39, which are transmitted with the spreading coefficient of 64, are stored in their respective storages 760 and 761 of the spreading coefficient row of 64. The symbol information items 719, 720, . . . , 721, 722, 723 and 724 having symbol numbers 0, 1, . . . , 16, 17, 18 and 19, which are transmitted with the spreading coefficient of 128, are stored in their respective storages 739, 740, . . . , 741, 742, 743 and 744 of the spreading coefficient row of 128. Further, the symbol information items 725 and 726 having symbol numbers 0 and 1, which are transmitted with the spreading coefficient of 256, are stored in their respective storages 731 and 732 of the spreading coefficient row of 256.

The element number determining section 102 determines the number of elements stored in the respective storages (spreading coefficient rows). When the number of elements reaches a given value, the section 102 starts to extract elements from the spreading coefficient rows. Assume that the number of elements in the spreading coefficient row of 256 is two, the number of elements in the spreading coefficient row of 128 is four, and the number of elements in the spreading coefficient row of 64 is eight. As shown in FIG. 10B, the symbol information items 717 and 718 having symbol numbers 38 and 39 of the spreading coefficient row of 64 is read out and output as symbol information items 747 and 748 since the number of elements in the spreading coefficient row of 64 is not zero. The symbol information item 739 having symbol number 0, which is stored in the spreading coefficient row of 128, is output as symbol information item 749 since the number of element in the spreading coefficient row of 128 becomes four. The symbol information items 740 to 744 having symbol numbers 1 to 19, which are stored in the spreading coefficient row of 128, are read out of the delay buffer 213 as a symbol information items 750 to 754 since the number of elements in the spreading coefficient row of 128 is not zero. The symbol information item 731 having symbol number 0, which is stored in the spreading coefficient row of 256, is read out of the delay buffer 213 and output as a symbol information item 755 since the number of elements in the spreading coefficient row of 256 becomes two when the symbol information item having symbol number 1 is stored in the spreading coefficient row of 256. The symbol information item 732 having symbol number 1, which is stored in the spreading coefficient row of 256, is output as a symbol information item 756 since the number of elements in the spreading coefficient row of 256 is not zero. The symbol interval of each of the symbol information items 747 to 756 output from the delay buffer 213 is the same as that of its corresponding one of symbol information items 707 to 716 in the transmission line.

The above three-step change from a high spreading coefficient to a low spreading one or from a low spreading coefficient to a high spreading one is basically the same as the two-step change shown in FIGS. 7A and 7B and 8A and 8B, and the same advantages can be obtained.

It is needless to say that the present invention can be applied to a four-or-more-step change in spreading coefficient.

The foregoing descriptions are directed to a one-way change from a high spreading coefficient to a low spreading one or from a low spreading coefficient to a high spreading one. The same advantage can be obtained irrespective of the direction of a change in spreading coefficient.

Figure 11:
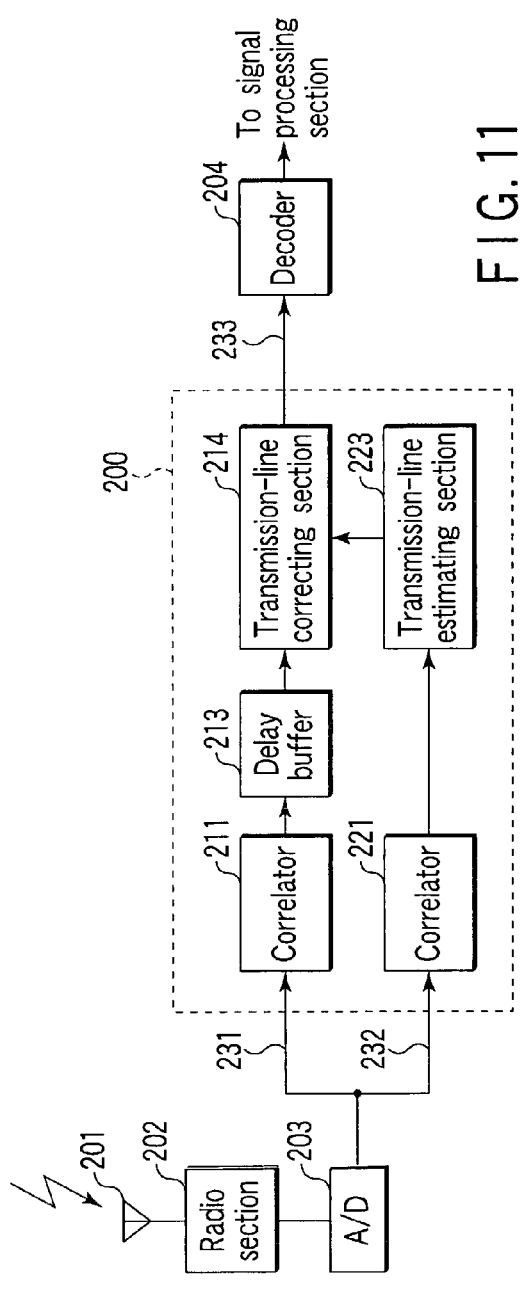
FIG. 11 is a block diagram of a modification to the system shown in FIG. 4.

FIG. 11 shows a modification to the code division multiple access system according to the first embodiment of the present invention. Only one finger is used in this modification. Since, therefore, no delay adjustment between fingers is needed, the system shown in FIG. 11 does not include any equivalents for the finger-to-finger delay adjusting sections 212 and 222 shown in FIG. 4.

As shown in FIG. 11, data for each symbol (symbol information) extracted from the correlator 211 is input to the delay buffer 213. Symbol information extracted from the correlator 221 is input to the transmission-line estimating section 223.

The system with the above configuration basically performs the same operation as that of the system shown in FIG. 4 and produces substantially the same advantages.

Figure 12:
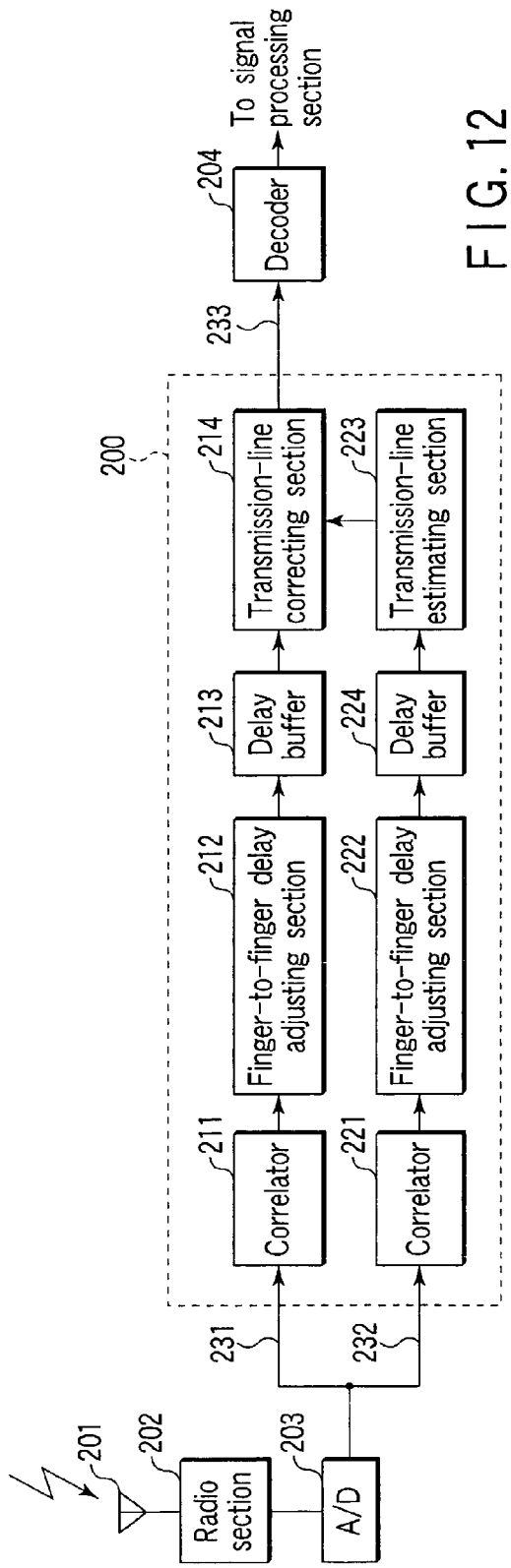
FIG. 12 is a schematic block diagram for explaining a code division multiple access (CDMA) system according to a second embodiment of the present invention and a method for controlling timing of a transmission-line correction in the CDMA system, which shows a section to which a transmission-line estimated value for one finger is applied.

FIG. 12 is a schematic block diagram for explaining a code division multiple access (CDMA) system according to a second embodiment of the present invention and a method for controlling timing of a transmission-line correction in the CDMA system. It particularly shows a section 200 to which a transmission-line estimated value for one finger is applied. The second embodiment differs from the first embodiment in that a delay buffer is provided in a path for a pilot channel as well as a path for an information channel.

The section 200 includes a correlator 211, a finger-to-finger delay adjusting section 212, a delay buffer 213, a transmission-line correcting section 214, a correlator 221, a finger-to-finger delay adjusting section 222, a delay buffer 224, and a transmission-line estimating section 223.

The information of the information channel output from the A/D converter 203 is input to the correlator 211 via an input line 231. The correlator 211 correlates the information of the information channel with a spreading code to extract data for each symbol (symbol information). If there are a plurality of fingers, the symbol information is input to the finger-to-finger delay adjusting section 212 to adjust a delay difference between the fingers. The information is then supplied to the delay buffer 213. The delay buffer 213 is used to adjust a difference in timing at which the symbol information is output from the correlator, the difference being caused by a difference in spreading coefficient. The adjusted symbol information is sent to the correcting section 214.

On the other hand, the information of the pilot channel output from the A/D converter 203 is input to the correlator 221 via an input line 232. The correlator 221 correlates the information of the pilot channel with a spreading code to extract data for each symbol (symbol information). If there are a plurality of fingers, the symbol information is input to the finger-to-finger delay adjusting section 222 to adjust a delay difference between the fingers. The information is then supplied to the delay buffer 224. The delay buffer 224 adjusts a difference in timing at which the symbol information is output from the correlator 221, the difference being caused by a difference in spreading coefficient. The adjusted symbol information is sent to the estimating section 223. The estimating section 223 performs a complex multiplication or the like to obtain transmission-line estimated value information from the known pilot information and then supplies the information to the correcting section 214. The correcting section 214 corrects the information of the information channel based on the transmission-line estimated value information obtained by the estimating section 223.

The delay buffer 224 has substantially the same configuration as that of the delay buffer 213 shown in FIG. 5 and basically performs an operation as indicated by the flowchart shown in FIG. 6. The delay buffer 224 is supplied with symbol information from the finger-to-finger delay adjusting section 222. A symbol information dividing section 101 divides the symbol information into FIFO storages (queues) 111 to 11n in accordance with the spreading coefficient of the spreading code used in the correlator 221. An element number determining section 102 determines whether the number of elements held in a storage for each spreading coefficient (spreading coefficient row) is larger than a given amount. If the number is larger than the given amount, the section 102 removes the elements from the spreading coefficient row and outputs them to the estimating section 223 through an output line 122. If a read operation has already started from a certain storage (spreading coefficient row), it continues until the number of elements held therein becomes zero.

In the above configuration of the CDMA system according to the second embodiment, a difference in timing at which data is output from each of the correlator 211 of the pilot channel and the correlator 221 of the information channel can be eliminated using a queue for each spreading coefficient. Moreover, the second embodiment can be applied to the case where the spreading coefficient of the information channel is higher than that of the pilot channel and the case where a protocol regulating a variable spreading coefficient in the pilot channel appears.

Figure 13:
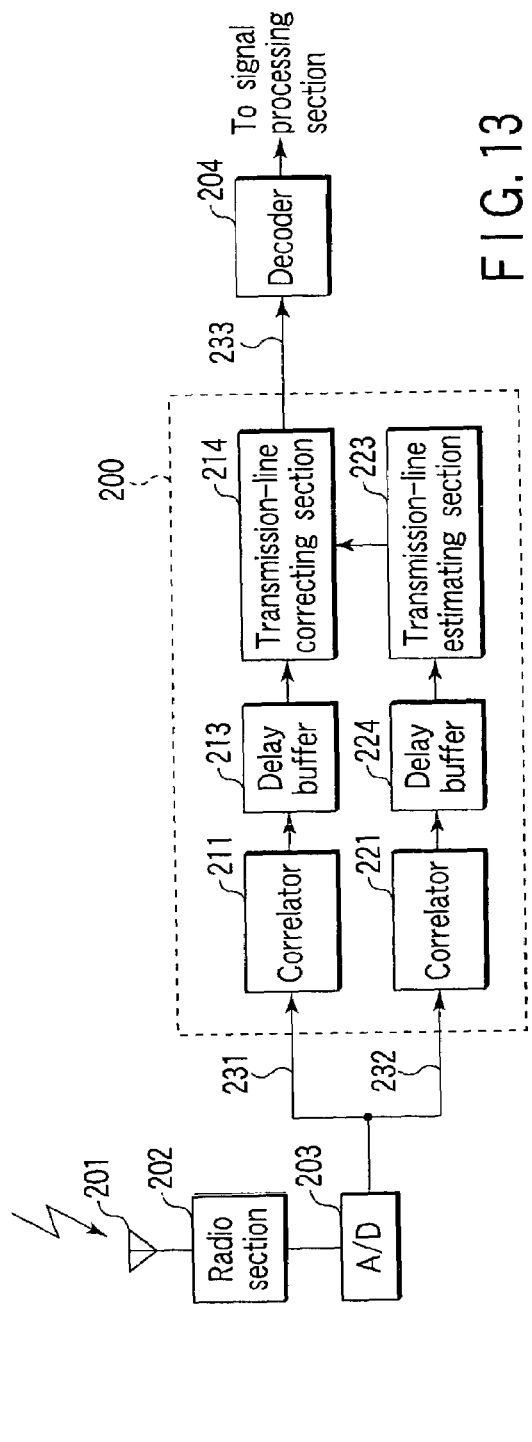
FIG. 13 is a block diagram of a modification to the system shown in FIG. 12.

FIG. 13 shows a modification to the code division multiple access system according to the second embodiment of the present invention. Only one finger is used in this modification. Since, therefore, no delay adjustment between fingers is needed, the system shown in FIG. 13 does not include any equivalents for the finger-to-finger delay adjusting sections 212 and 222 shown in FIG. 12.

As shown in FIG. 12, data for each symbol (symbol information) extracted from the correlator 211 is input to the delay buffer 213. Symbol information extracted from the correlator 221 is input to the delay buffer 224.

The system with the above configuration basically performs the same operation as that of the system shown in FIG. 12 and produces substantially the same advantages.

Figure 14:
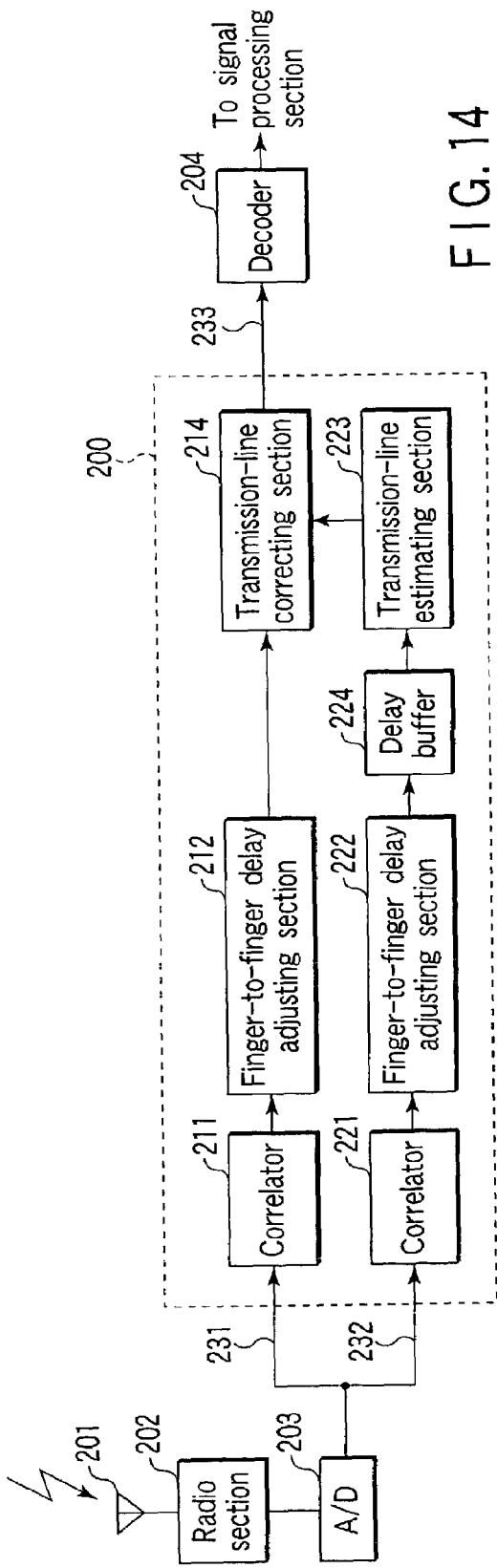
FIG. 14 is a schematic block diagram for explaining a code division multiple access (CDMA) system according to a third embodiment of the present invention and a method for controlling timing of a transmission-line correction in the CDMA system, which shows a section to which a transmission-line estimated value for one finger is applied.

FIG. 14 is a schematic block diagram for explaining a code division multiple access (CDMA) system according to a third embodiment of the present invention and a method for controlling timing of a transmission-line correction in the CDMA system. It particularly shows a section 200 to which a transmission-line estimated value for one finger is applied. In the third embodiment, a delay buffer 224 is provided only in a path for a pilot channel.

In FIG. 14, the same constituting elements as those of FIG. 4 or 12 are denoted by the same reference numerals and their detailed descriptions are omitted.

The third embodiment can be applied to the case where the spreading coefficient of the information channel is higher than that of the pilot channel and the case where a protocol regulating a variable spreading coefficient in the pilot channel appears.

Figure 15:
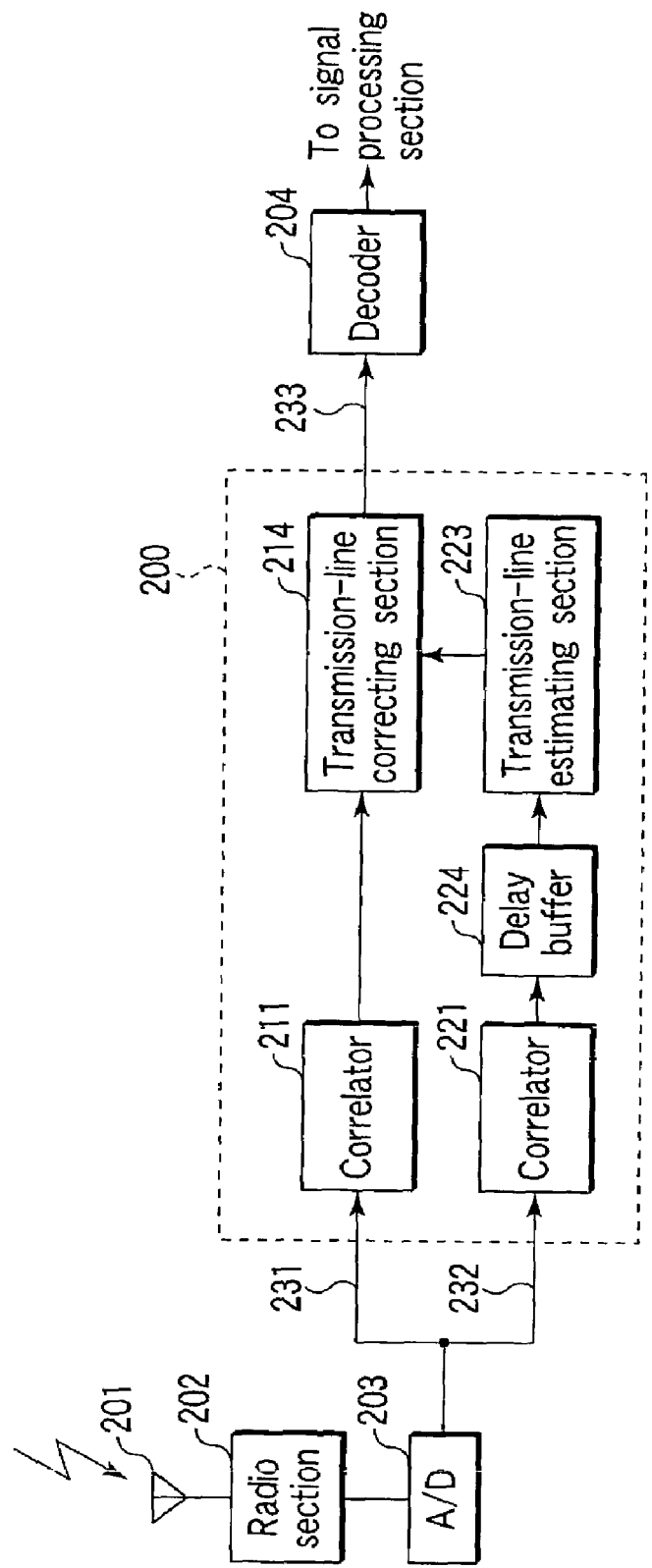
FIG. 15 is a block diagram of a modification to the system shown in FIG. 14.

FIG. 15 shows a modification to the code division multiple access system according to the third embodiment of the present invention. Only one finger is used in this modification. Since, therefore, no delay adjustment between fingers is needed, the system shown in FIG. 15 does not include any equivalents for the finger-to-finger delay adjusting sections 212 and 222 shown in FIG. 14.

As shown in FIG. 15, data for each symbol (symbol information) extracted from the correlator 211 is input to the correcting section 214. Symbol information extracted from the correlator 221 is input to the delay buffer 224.

The system with the above configuration basically performs the same operation as that of the system shown in FIG. 14 and produces substantially the same advantages.

As described above, according to one aspect of the present invention, there is provided a code division multiple access system capable of eliminating a difference in timing at which data is output from each of correlators of pilot and information channels using a queue for each spreading coefficient and a method for controlling transmission-line correction timing of the system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code division multiple access system comprising:
a first correlator which correlates information of an information channel and a spreading code with each other to extract data for each symbol;
a delay buffer which is supplied with the data for each symbol extracted from the first correlator to adjust a difference in timing at which the data is output from the first correlator, the difference being caused by a difference in spreading coefficient;
a transmission-line correcting section which is supplied with an output signal of the delay buffer;
a second correlator which correlates information of a pilot channel and a spreading code with each other to extract data for each symbol; and
a transmission-line estimating section which is supplied with the data for each symbol extracted from the second correlator to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section;
wherein the delay buffer includes a symbol information dividing section which divides symbol information in accordance with a spreading coefficient of the spreading code used in the first correlator, a storage which is provided for each spreading coefficient to hold the symbol information divided by the symbol information dividing section, and an element number determining section which determines whether the number of elements held in the storage is larger than a given amount.

2. A code division multiple access system comprising:
a first correlator which correlates information of an information channel and a spreading code with each other to extract data for each symbol;
a first finger-to-finger delay adjusting section which is supplied with the data for each symbol extracted from the first correlator to adjust a delay difference between fingers;
a delay buffer which is supplied with an output signal of the first finger-to-finger delay adjusting section to adjust a difference in timing at which the data is output from the first correlator, the difference being caused by a difference in spreading coefficient;
a transmission-line correcting section which is supplied with an output signal of the delay buffer;
a second correlator which correlates information of a pilot channel and a spreading code with each other to extract data for each symbol;
a second finger-to-finger delay adjusting section which is supplied with the data for each symbol extracted from the second correlator to adjust a delay difference between fingers; and
a transmission-line estimating section which is supplied with an output signal of the second finger-tofinger delay adjusting section to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section;

wherein the delay buffer includes a symbol information dividing section which divides symbol information in accordance with a spreading coefficient of the spreading code used in the first correlator, a storage which is provided for each spreading coefficient to hold the symbol information divided by the symbol information dividing section, and an element number determining section which determines whether the number of elements held in the storage is larger than a given amount.

3. A code division multiple access system comprising:

a first correlator which correlates information of an information channel and a spreading code with each other to extract data for each symbol;

a first delay buffer which is supplied with the data for each symbol extracted from the first correlator to adjust a difference in timing at which the data is output from the first correlator, the difference being caused by a difference in spreading coefficient;

a transmission-line correcting section which is supplied with an output signal of the first delay buffer, a second correlator which correlates information of a pilot channel and a spreading code with each other to extract data for each symbol;

a second delay buffer which is supplied with the data for each symbol extracted from the second correlator to adjust a difference in timing at which the data is output from the second correlator, the difference being caused by a difference in spreading coefficient; and a transmission-line estimating section which is supplied with an output signal of the second delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section;

wherein the first delay buffer includes a first symbol information dividing section which divides symbol information in accordance with a spreading coefficient of the spreading code used in the first correlator, a first storage which is provided for each spreading coefficient to hold the symbol information divided by the first symbol information dividing section, and a first element number determining section which determines whether the number of elements held in the first storage is larger than a given amount, and the second delay buffer includes a second symbol information dividing section which divides symbol information in accordance with a spreading coefficient of the spreading code used in the second correlator, a second storage which is provided for each spreading coefficient to hold the symbol information divided by the second symbol information dividing section, and a second element number determining section which determines whether the number of elements held in the second storage is larger than a given amount.

4. A code division multiple access system comprising:

a first correlator which correlates information of an information channel and a spreading code with each other to extract data for each symbol;

a first finger-to-finger delay adjusting section which is supplied with the data for each symbol extracted from the first correlator to adjust a delay difference between fingers;

a first delay buffer which is supplied with an output signal of the first finger-to-finger delay adjusting section to adjust a difference in timing at which the data is output from the first correlator, the difference being caused by a difference in spreading coefficient;

a transmission-line correcting section which is supplied with an output signal of the first delay buffer, a second correlator which correlates information of a pilot channel and a spreading code wit each other to extract data for each symbol;

a second finger-to-finger delay adjusting section which is supplied with the data for each symbol extracted from the second correlator to adjust a delay difference between fingers;

a second delay buffer which is supplied with an output signal of the second finger-to-finger delay adjusting section to adjust a difference in dining at which the data is output from the second correlator, the difference being caused by a difference in spreading coefficient; and a transmission-line estimating section which is supplied with an output signal of the second delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section;

wherein the first delay buffer includes a first symbol information dividing section which divides symbol information in accordance with a spreading coefficient of the spreading code used in the first correlator, a first storage which is provided for each spreading coefficient to hold the symbol information divided by the first symbol information dividing section, and a first element number determining section which determines whether the number of elements held in the first storage is larger than a given amount, and the second delay buffer includes a second symbol information dividing section which divides symbol information in accordance with a spreading coefficient of the spreading code used in the second correlator, a second storage which is provided for each spreading coefficient to hold the symbol information divided byte second symbol information dividing section, and a second element number determining section which determines whether the number of elements held in the second storage is larger than a given amount.

5. A code division multiple access system comprising:
a first correlator which correlates information of an information channel and a spreading code with each other to exact data for each symbol;
- a transmission-line correcting section supplied with data from the first correlator;
- a second correlator which correlates information of a pilot channel and a spreading code with each other to extract data for each symbol;
- a delay buffer which is supplied with the data for each symbol extracted from the second correlator to adjust a difference in timing at which the data is output from the second correlator, the difference being caused by a difference in spreading coefficient; and
- a transmission-line estimating section which is supplied with an output signal of the delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section;
- wherein the delay buffer includes a symbol information dividing section which divides symbol information in accordance with a spreading coefficient of the spreading code used in the second correlator, a storage which is provided for each spreading coefficient to hold the symbol information divided by the symbol information dividing section, and an element number determining section which determines whether the number of elements held in the storage is larger than a given amount.

6. A code division multiple access system comprising:
a first correlator which correlates information of an information channel and a spreading code with each other to extract data for each symbol;
- a first finger-to-finger delay adjusting section which is supplied with the data for each symbol extracted from the first correlator to adjust a delay difference between fingers;
- a transmission-line correcting section supplied with an output signal of the first finger-to-finger delay adjusting section;
- a second correlator which correlates information of a pilot channel and a spreading code wit each other to extract data for each symbol;
- a second finger-to-finger delay adjusting section which is supplied with the data for each symbol extracted from the second correlator to adjust a delay difference between fingers;
- a delay buffer which is supplied with an output signal of the second finger-to-finger delay adjusting section to adjust a difference in timing at which the data is output from the second correlator, the difference being caused by a difference in spreading coefficient; and
- a transmission-line estimating section which is supplied with an output signal of the delay buffer to obtain a transmission-line response from pilot information and supply transmission-line estimated value information to the transmission-line correcting section using the transmission-line response as an estimated value, wherein the transmission-line correcting section makes a transmission-line correction to the information of the information channel based on the transmission-line estimated value information obtained by the transmission-line estimating section;
- wherein the delay buffer includes a symbol information dividing section which divides symbol information in accordance with a spreading coefficient of the spreading code used in the second correlator, a storage which is provided for each spreading coefficient to hold the symbol information divided by the symbol information dividing section, and an element number determining section which determines whether the number of elements held in the storage is larger than a given amount.

7. A method for controlling transmission-line correction timing of a code division multiple access system, comprising:
- correlating information of an information channel and a spreading code with each other to extract data for each symbol;
- classifying the extracted data of the information channel for said each symbol in accordance with a spreading coefficient of the spreading code;
- storing, into an information channel storage for said each spreading coefficient, the classified information channel data for said each symbol,
- determining whether number of elements for said each spreading coefficient held in the information channel storage exceeds a preset value;
- removing the elements from the information channel storage when the number exceeds the preset value;
- correlating information of a pilot channel and a spreading code with each other to extract data for said each symbol;
- classifying the extracted data of the pilot channel for said each symbol in accordance with the spreading coefficient of the spreading code;
- storing, into a pilot channel storage for said each spreading coefficient, the classified pilot channel data for said each symbol,
- determining whether number of elements for said each spreading coefficient held in the pilot channel storage exceeds a preset value;
- removing the elements from the pilot channel storage when the number for said each spreading coefficient held in the pilot channel storage exceeds the preset value;
- obtaining a transmission-line response from the elements removed from the pilot channel storage for said each spreading coefficient; and
- making a transmission-line correction to the information of the information channel based on transmission-line estimated value information using the transmission-line response as an estimated value.

8. The method according to claim 7, further comprising:
- eliminating a delay difference between fingers after the data for each symbol is extracted by correlating information of the information channel and the spreading code with each other; and
- eliminating a delay difference between fingers after the data for each symbol is extracted by correlating information of the pilot channel and the spreading code with each other.

9. A method for controlling transmission-line correction timing of a code division multiple access system, comprising:

correlating information of an information channel and a spreading code with each other to extract data for each symbol;

classifying the extracted data of the information channel for said each symbol in accordance with a spreading coefficient of the spreading code;

storing, into an information channel storage for said each spreading coefficient, the classified information channel data for said each symbol, removing elements from the information channel storage when the number of elements for said each spreading coefficient held in the information channel storage becomes larger than a first value;

repeatedly removing elements until the number of elements becomes smaller than a second value after the elements start to be removed from the information channel storage;

correlating information of a pilot channel and a spreading code wit each other to extract data for each symbol;

classifying the extracted data of the pilot channel for said each symbol in accordance with the spreading coefficient of the spreading code;

storing, into a pilot channel storage for each spreading coefficient, the classified pilot channel data for said each symbol, removing elements from the pilot channel storage when the number of elements for said each spreading coefficient held in the pilot channel storage becomes larger than a third value;

repeatedly removing elements until the number of elements becomes smaller than a fourth value after the elements start to be removed from the pilot channel storage;

obtaining a transmission-line response from the elements removed from the pilot channel storage for said each spreading coefficient; and making a transmission-line correction to the information of the information channel based on transmission-line estimated value information using the transmission-line response as an estimated value.

10. The method according to claim 9, further comprising:

eliminating a delay difference between fingers after the data for each symbol is extracted by correlating information of the information channel and the spreading code with each other; and eliminating a delay difference between fingers after the data for each symbol is extracted by correlating information of the pilot channel and the spreading code with each other.

11. A method for controlling transmission-line correction timing of a code division multiple access system, comprising:

correlating information of an information channel and a spreading code with each other to extract data for each symbol;

correlating information of a pilot channel and a spreading code with each other to extract data for said each symbol;

classifying the extracted data of the pilot channel for said each symbol in accordance with a spreading coefficient of the spreading code;

queuing, for each spreading coefficient, the classified data of the pilot channel for said each symbol;

providing a delay to the extracted data of the pilot channel for said each symbol by reading, for said each spreading coefficient, the queued data of the pilot channel for said each symbol, the delay varying from spreading coefficient to spreading coefficient;

obtaining a transmission-line response from the data of the pilot channel for said each symbol to which the delay is provided; and making a transmission-line correction to the information of the information channel based on transmission-line estimated value information using the transmission-line response as an estimated value.

12. The method according to claim 11, further comprising:

eliminating a delay difference between fingers after the data for each symbol is extracted by correlating information of the information channel and the spreading code wit each other; and eliminating a delay difference between fingers after the data for each symbol is extracted by correlating information of the pilot channel and the spreading code with each other.

13. A method for controlling transmission-line correction timing of a code division multiple access system, comprising:

correlating information of an information channel and a spreading code with each other to extract data for each symbol;

correlating information of a pilot channel and a spreading code with each other to extract data for said each symbol;

classifying the extracted data of the pilot channel for said each symbol in accordance with a spreading coefficient of the spreading code;

queuing, for each spreading coefficient, the classified data of the pilot channel for said each symbol in a storage;

removing elements from a storage when the number of elements for said each spreading coefficient held in the storage becomes larger than a given value;

obtaining a transmission-line response from the elements removed from the storage for said each spreading coefficient; and making a transmission-line correction to the information of the information channel based on transmission-line estimated value information using the transmission-line response as an estimated value.

14. The method according to claim 13, further comprising:

eliminating a delay difference between fingers after the data for each symbol is extracted by correlating information of the information channel and the spreading code with each other; and eliminating a delay difference between fingers after the data for each symbol is extracted by correlating information of the pilot channel and the spreading code with each other.

15. A method for controlling transmission-line correction timing of a code division multiple access system, comprising:

correlating information of an information channel and a spreading code with each other to extract data for each symbol;

correlating information of a pilot channel and a spreading code with each other to extract data for said each symbol;

classifying the extracted data of the pilot channel for said each symbol in accordance with a spreading coefficient of the spreading code;

queuing, for each spreading coefficient, the classified data of the pilot channel for said each symbol in a storage;

removing elements from a storage when the number of elements for said each spreading coefficient held in the storage becomes larger than a first value;

repeatedly removing elements until the number of elements becomes smaller than a second value after the elements start to be removed from the storage;

obtaining a transmission-line response from the elements removed from the storage for said each spreading coefficient; and making a transmission-line correction to the information of the information channel based on transmission-line estimated value information using the transmission-line response as an estimated value.

16. The method according to claim 15, further comprising:

eliminating a delay difference between fingers after the data for each symbol is extracted by correlating information of the information channel and the spreading code with each other; and eliminating a delay difference between fingers after the data for each symbol is extracted by correlating information of the pilot channel and the spreading code with each other.

* * * * *